(12) United States Patent
Wang

(10) Patent No.: US 8,411,590 B2
(45) Date of Patent: Apr. 2, 2013

(54) MESH NETWORK REMOTE CONTROL DEVICE

(75) Inventor: Ray Wang, McLean, VA (US)

(73) Assignee: Mobitrum Corporation, McLean, VA (US)

( * ) Notice: Subject to any disclaimer, the term of this patent is extended or adjusted under 35 U.S.C. 154(b) by 227 days.

(21) Appl. No.: 13/088,519

(22) Filed: Apr. 18, 2011

(65) Prior Publication Data

US 2011/0210816 A1    Sep. 1, 2011

Related U.S. Application Data

(63) Continuation-in-part of application No. 12/884,521, filed on Sep. 17, 2010, now Pat. No. 8,305,935, which is a continuation-in-part of application No. 11/880,271, filed on Jul. 20, 2007, now Pat. No. 7,801,058.

(60) Provisional application No. 60/833,741, filed on Jul. 27, 2006, provisional application No. 61/331,454, filed on May 5, 2010.

(51) Int. Cl.
*H04L 12/28* (2006.01)

(52) U.S. Cl. ............... 370/254; 370/351; 455/456.1

(58) Field of Classification Search ............ 370/252, 370/254–255, 338, 406–408, 248
See application file for complete search history.

(56) References Cited

U.S. PATENT DOCUMENTS

| | | | |
|---|---|---|---|
| 3,960,722 A | 6/1976 | Tomikawa |
| 4,048,075 A | 9/1977 | Colvin |
| 4,053,677 A | 10/1977 | Corao |
| 4,119,096 A | 10/1978 | Drews |
| 4,135,564 A | 1/1979 | Muller |
| 4,142,950 A | 3/1979 | Creamer |
| 4,158,275 A | 6/1979 | Moore |
| 4,221,854 A | 9/1980 | Hammar |
| 4,222,563 A | 9/1980 | Heftler |
| 4,226,408 A | 10/1980 | Tomita |
| 4,280,075 A | 7/1981 | Comby |
| 4,286,362 A | 9/1981 | Hammar |
| 4,342,884 A | 8/1982 | Ban |
| 4,343,690 A | 8/1982 | de Nora |
| 4,373,027 A | 2/1983 | Berneman |
| 4,400,287 A | 8/1983 | Kimura |
| 4,440,000 A | 4/1984 | Bacchus |
| 4,455,187 A | 6/1984 | von Blucher |
| 4,479,875 A | 10/1984 | Nelson |
| 4,562,015 A | 12/1985 | Lefevre |
| 4,564,539 A | 1/1986 | Tsuji |
| 4,654,556 A | 3/1987 | Comby |
| 4,693,986 A | 9/1987 | Vit |
| 4,698,768 A | 10/1987 | Thuy |
| 4,751,869 A | 6/1988 | Paynter |
| 4,781,056 A | 11/1988 | Noel |
| 4,788,088 A | 11/1988 | Kohl |
| 4,837,850 A | 6/1989 | Maisel |

(Continued)

*Primary Examiner* — Ayaz Sheikh
*Assistant Examiner* — Mounir Moutaouakil
(74) *Attorney, Agent, or Firm* — Lesavich High-Tech Law Group; P.C; Stephen Lesavich

(57) ABSTRACT

The mesh network remote control device is able to dynamically exchange information with other mesh network devices via a mesh network, partial mesh network, ad-hoc network or with an non-mesh network such as the Internet or an intranet. The mesh network remote control device controls devices connected to such mesh or non-mesh networks. The mesh network remote control device accepts commands from mesh network devices, non-mesh network devices, non-mesh communications networks (e.g., URLs, device commands, social networking logins, etc.), stores the original commands and transforms the original commands into simple display commands that are used by a user to control remote mesh network or non-mesh network devices.

9 Claims, 12 Drawing Sheets

U.S. PATENT DOCUMENTS

| | | |
|---|---|---|
| 4,917,537 A | 4/1990 | Jacobson |
| 4,940,972 A | 7/1990 | Mouchot |
| 5,034,352 A | 7/1991 | Vit |
| 5,042,463 A | 8/1991 | Lekholm |
| 5,105,424 A | 4/1992 | Flaig |
| 5,128,789 A | 7/1992 | Abramovitz |
| 5,182,440 A | 1/1993 | Dufour |
| 5,207,687 A | 5/1993 | Bernon |
| 5,218,565 A | 6/1993 | Mou |
| 5,236,027 A | 8/1993 | Lu |
| 5,309,107 A | 5/1994 | Pausch |
| 5,365,518 A | 11/1994 | Noser |
| 5,396,359 A | 3/1995 | Abramovitz |
| 5,447,776 A | 9/1995 | Disselbeck |
| 5,448,389 A | 9/1995 | Peacock |
| 5,477,888 A | 12/1995 | Mezzalira |
| 5,512,828 A | 4/1996 | Pausch |
| 5,530,575 A | 6/1996 | Acampora |
| 5,545,318 A | 8/1996 | Richmond |
| 5,550,805 A | 8/1996 | Takatori |
| 5,571,080 A | 11/1996 | Jensen |
| 5,571,352 A | 11/1996 | Disselbeck |
| 5,581,187 A | 12/1996 | Pausch |
| 5,592,610 A | 1/1997 | Chittor |
| 5,606,666 A | 2/1997 | Grant |
| 5,670,278 A | 9/1997 | Disselbeck |
| 5,682,537 A | 10/1997 | Davies |
| 5,689,647 A | 11/1997 | Miura |
| 5,703,834 A | 12/1997 | Bonnefoy |
| 5,802,054 A | 9/1998 | Bellenger |
| 5,842,034 A | 11/1998 | Bolstad et al. |
| 5,884,017 A | 3/1999 | Fee |
| 5,934,614 A | 8/1999 | Mueller |
| 5,949,760 A | 9/1999 | Stevens |
| 5,959,999 A | 9/1999 | An |
| 5,963,546 A | 10/1999 | Shoji |
| 6,038,044 A | 3/2000 | Fee |
| 6,049,593 A | 4/2000 | Acampora |
| 6,113,080 A | 9/2000 | Kazuma |
| 6,143,029 A | 11/2000 | Rippstein |
| 6,154,587 A | 11/2000 | Okayama |
| 6,189,102 B1 | 2/2001 | Beser |
| 6,219,346 B1 | 4/2001 | Maxemchuk |
| 6,256,306 B1 | 7/2001 | Bellenger |
| 6,298,053 B1 | 10/2001 | Flammer, III |
| 6,314,163 B1 | 11/2001 | Acampora |
| 6,324,162 B1 | 11/2001 | Chaudhuri |
| 6,329,902 B1 | 12/2001 | Lee |
| 6,370,110 B1 | 4/2002 | Eslambolchi |
| 6,396,837 B1 | 5/2002 | Wang |
| 6,403,210 B1 | 6/2002 | Stuivinga |
| 6,460,128 B1 | 10/2002 | Baxter |
| 6,480,497 B1 | 11/2002 | Flammer, III |
| 6,549,513 B1 | 4/2003 | Chao |
| 6,618,611 B2 | 9/2003 | Gebhardt |
| 6,640,087 B2 | 10/2003 | Reed et al. |
| 6,654,379 B1 | 11/2003 | Grover |
| 6,711,166 B1 | 3/2004 | Amir |
| 6,735,393 B1 | 5/2004 | Zouganeli |
| 6,763,190 B2 | 7/2004 | Agrawal |
| 6,780,340 B2 | 8/2004 | Conta |
| 6,785,725 B1 | 8/2004 | Ramanan |
| 6,805,732 B1 | 10/2004 | Billiotte |
| 6,823,180 B2 | 11/2004 | Reed |
| 6,835,173 B2 | 12/2004 | Couvillon, Jr. |
| 6,848,006 B1 | 1/2005 | Hermann |
| 6,850,502 B1 | 2/2005 | Kagan |
| 6,853,641 B2 | 2/2005 | Lindhorst-Ko |
| 6,856,592 B2 | 2/2005 | Grover |
| 6,879,574 B2 | 4/2005 | Naghian |
| 6,904,364 B2 | 6/2005 | Randazzo |
| 6,909,903 B2 | 6/2005 | Wang |
| 6,912,204 B2 | 6/2005 | Kossi |
| 6,917,759 B2 | 7/2005 | DeBoer |
| 6,934,248 B1 | 8/2005 | DeBoer |
| 6,940,866 B1 | 9/2005 | Miller |
| 6,948,048 B2 | 9/2005 | Baxter |
| 6,965,575 B2 | 11/2005 | Srikrishna |
| 6,965,969 B2 | 11/2005 | Burger |
| 6,970,417 B1 | 11/2005 | Doverspike |
| 6,970,808 B2 | 11/2005 | Abhulimen |
| 6,999,441 B2 | 2/2006 | Flammer, III |
| 7,003,313 B2 | 2/2006 | Garces |
| 7,012,887 B2 | 3/2006 | Zhu |
| 7,027,388 B2 | 4/2006 | Wen |
| 7,031,293 B1 | 4/2006 | Srikrishna |
| 7,031,757 B2 | 4/2006 | Schwengler |
| 7,039,067 B2 | 5/2006 | Feinberg |
| 7,042,988 B2 | 5/2006 | Juitt |
| 7,043,250 B1 | 5/2006 | DeMartino |
| 7,050,819 B2 | 5/2006 | Schwengler |
| 7,053,853 B2 | 5/2006 | Merenda |
| 7,054,262 B2 | 5/2006 | Gerstel |
| 7,058,021 B2 | 6/2006 | Srikrishna |
| 7,068,873 B2 | 6/2006 | Frankel |
| 7,069,483 B2 | 6/2006 | Gillies |
| 7,088,676 B1 | 8/2006 | Doverspike |
| 7,088,920 B2 | 8/2006 | Krishnaswamy |
| 7,089,089 B2 | 8/2006 | Cumming |
| 7,106,261 B2 | 9/2006 | Nagel |
| 7,117,466 B2 | 10/2006 | Kalafala |
| 7,119,758 B2 | 10/2006 | Louzir |
| 7,123,589 B1 | 10/2006 | Dawes |
| 7,133,359 B2 | 11/2006 | Weis |
| 7,203,743 B2 | 4/2007 | Shah-Heydari |
| 7,215,658 B2 | 5/2007 | Alastalo |
| 7,215,926 B2 | 5/2007 | Corbett |
| 7,224,642 B1 | 5/2007 | Tran |
| 7,233,620 B2 | 6/2007 | Brommer |
| 7,239,238 B2 | 7/2007 | Tester |
| 7,239,850 B2 | 7/2007 | Peikari |
| 7,242,664 B2 | 7/2007 | Einstein |
| 7,245,216 B2 | 7/2007 | Burkley |
| 7,248,217 B2 | 7/2007 | Mani |
| 7,251,570 B2 | 7/2007 | Hancock |
| 7,257,106 B2 | 8/2007 | Chen |
| 7,257,250 B2 | 8/2007 | Boier-Martin |
| 7,260,059 B2 | 8/2007 | Grover |
| 7,262,694 B2 | 8/2007 | Olsen |
| 7,263,379 B1 | 8/2007 | Parkulo |
| 7,269,347 B1 | 9/2007 | Matricardi |
| 7,271,736 B2 | 9/2007 | Siegel |
| 7,274,869 B1 | 9/2007 | Pan |
| 7,277,931 B1 | 10/2007 | Booth |
| 7,280,755 B2 | 10/2007 | Kang |
| 7,282,944 B2 | 10/2007 | Gunn |
| 7,283,494 B2 | 10/2007 | Hammel |
| 7,289,428 B2 | 10/2007 | Chow |
| 7,289,923 B2 | 10/2007 | Marovitz |
| 7,295,806 B2 | 11/2007 | Corbett |
| 7,298,240 B2 | 11/2007 | Lamar |
| 7,301,824 B1 | 11/2007 | New |
| 7,302,339 B2 | 11/2007 | Gray |
| 7,305,459 B2 | 12/2007 | Klemba |
| 7,308,198 B1 | 12/2007 | Chudak |
| 7,308,370 B2 | 12/2007 | Mason, Jr. et al. |
| 7,313,399 B2 | 12/2007 | Rhee et al. |
| 7,586,888 B2 | 9/2009 | Wang |
| 7,630,736 B2 | 12/2009 | Wang |
| 7,801,058 B2 * | 9/2010 | Wang .......................... 370/254 |
| 2002/0089712 A1 | 7/2002 | Kang |
| 2002/0181427 A1 | 12/2002 | Sparr et al. |
| 2003/0011839 A1 | 1/2003 | Liang |
| 2004/0248601 A1 | 12/2004 | Chang |
| 2005/0038876 A1 | 2/2005 | Chaudhuri |
| 2005/0048961 A1 | 3/2005 | Ribaudo |
| 2005/0071714 A1 | 3/2005 | Soga et al. |
| 2005/0074019 A1 | 4/2005 | Handforth |
| 2005/0135286 A1 | 6/2005 | Nurminen et al. |
| 2005/0141641 A1 | 6/2005 | Tanaka et al. |
| 2005/0190778 A1 | 9/2005 | Ozluturk |
| 2005/0193357 A1 | 9/2005 | Honary |
| 2005/0243765 A1 | 11/2005 | Schrader |
| 2005/0246112 A1 | 11/2005 | Abhulimen |
| 2005/0272430 A1 | 12/2005 | Griebling |
| 2005/0281237 A1 | 12/2005 | Heinonen |
| 2006/0031659 A1 | 2/2006 | Chow |

| | | |
|---|---|---|
| 2006/0095539 A1 | 5/2006 | Renkis |
| 2006/0133332 A1 | 6/2006 | Achanta |
| 2006/0133807 A1 | 6/2006 | Jenkins |
| 2006/0133817 A1 | 6/2006 | Xie |
| 2006/0154642 A1* | 7/2006 | Scannell, Jr. ............... 455/404.1 |
| 2006/0159024 A1 | 7/2006 | Hester |
| 2006/0182076 A1 | 8/2006 | Wang |
| 2006/0218225 A1 | 9/2006 | Hee Voon |
| 2006/0262737 A1 | 11/2006 | Livet |
| 2006/0268910 A1 | 11/2006 | Kawahara |
| 2007/0014573 A1 | 1/2007 | Wei |
| 2007/0066308 A1 | 3/2007 | Andric |
| 2007/0066874 A1 | 3/2007 | Cook |
| 2007/0086361 A1 | 4/2007 | Allan |
| 2007/0090996 A1 | 4/2007 | Wang |
| 2007/0091871 A1 | 4/2007 | Taha |
| 2007/0189249 A1 | 8/2007 | Gurevich |
| 2007/0195808 A1* | 8/2007 | Ehrlich et al. ................ 370/408 |
| 2007/0206521 A1 | 9/2007 | Osaje |
| 2007/0206616 A1 | 9/2007 | Orth |
| 2008/0025330 A1 | 1/2008 | Wang |
| 2009/0189739 A1 | 7/2009 | Wang |
| 2011/0019587 A1 | 1/2011 | Wang |

* cited by examiner

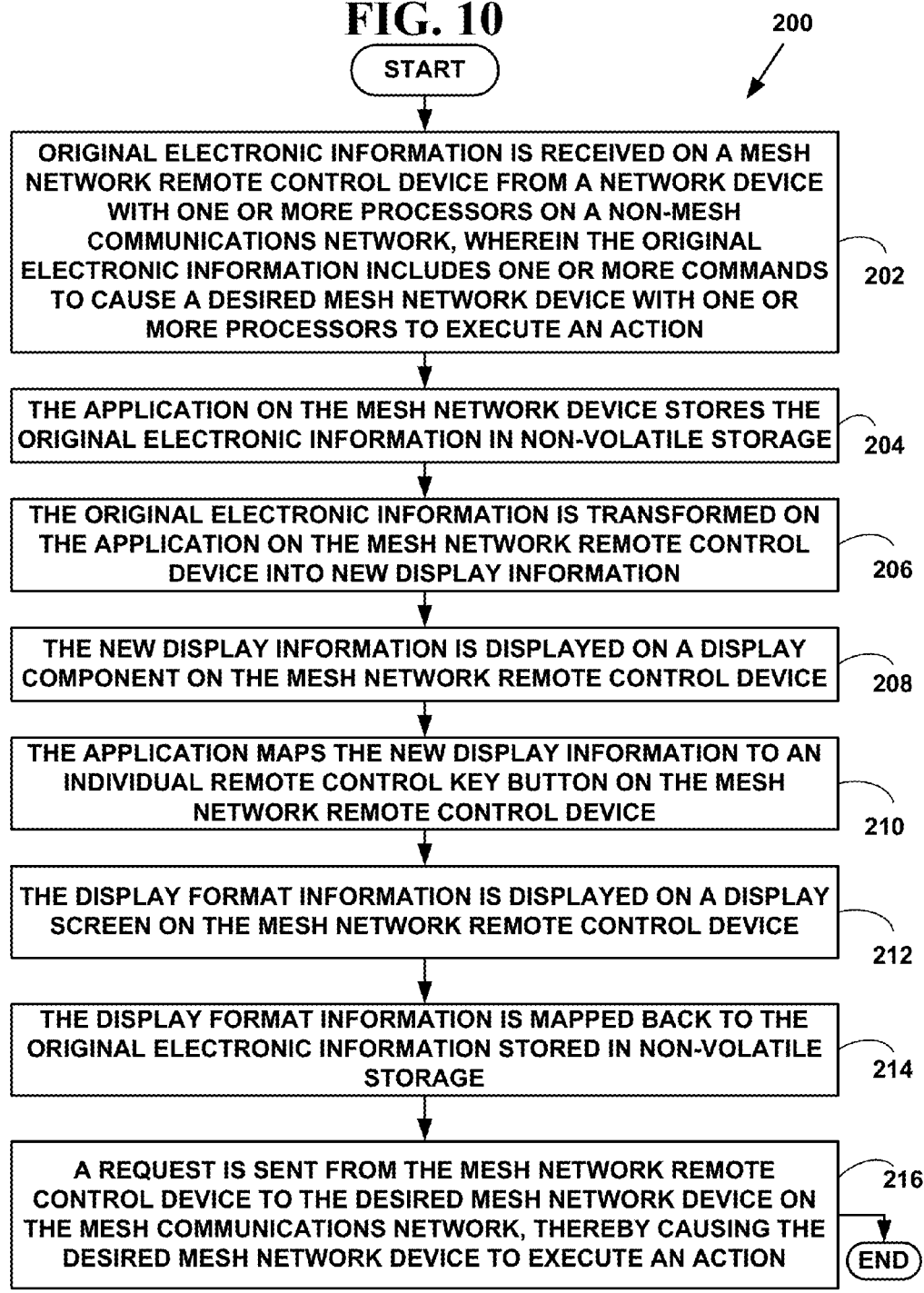

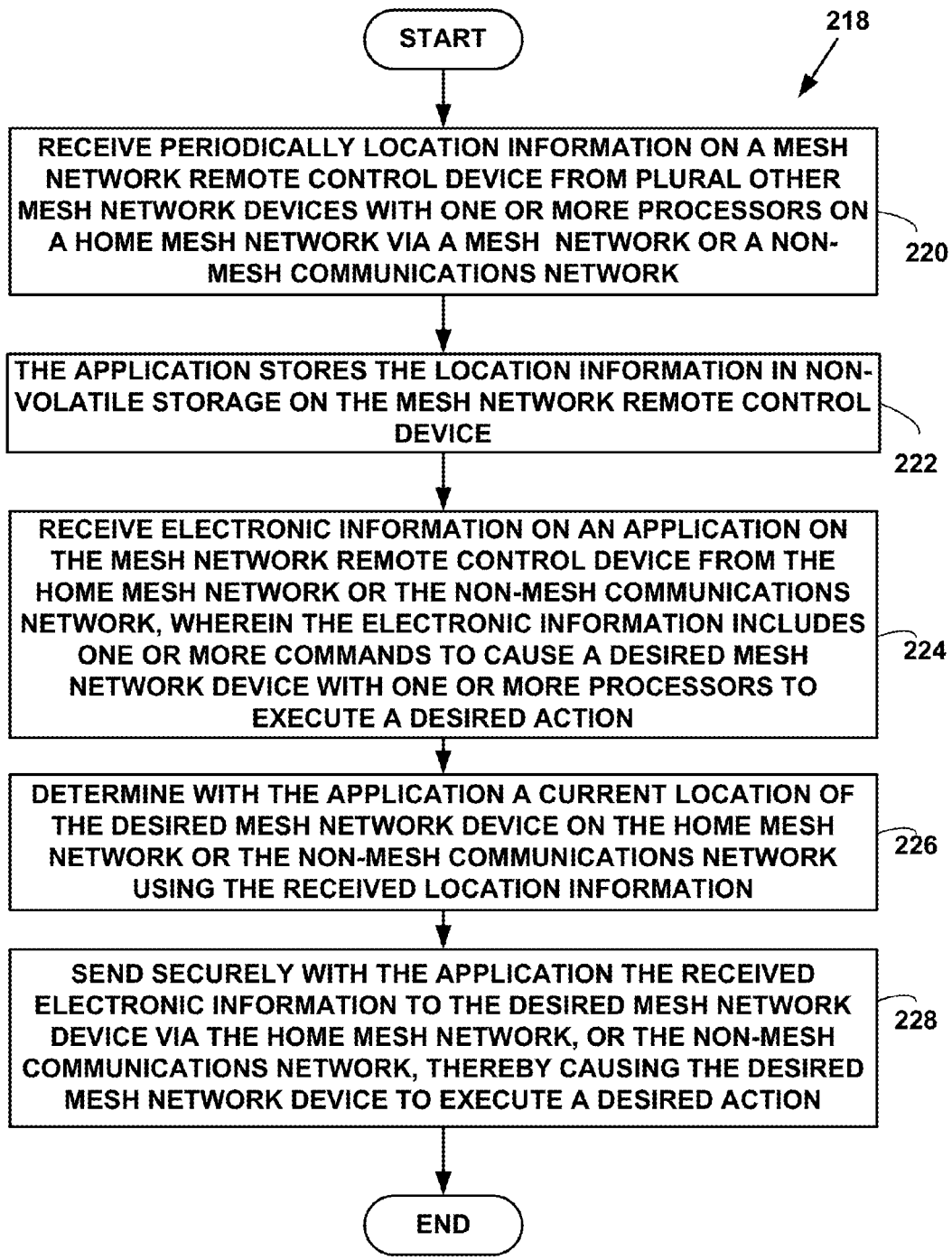

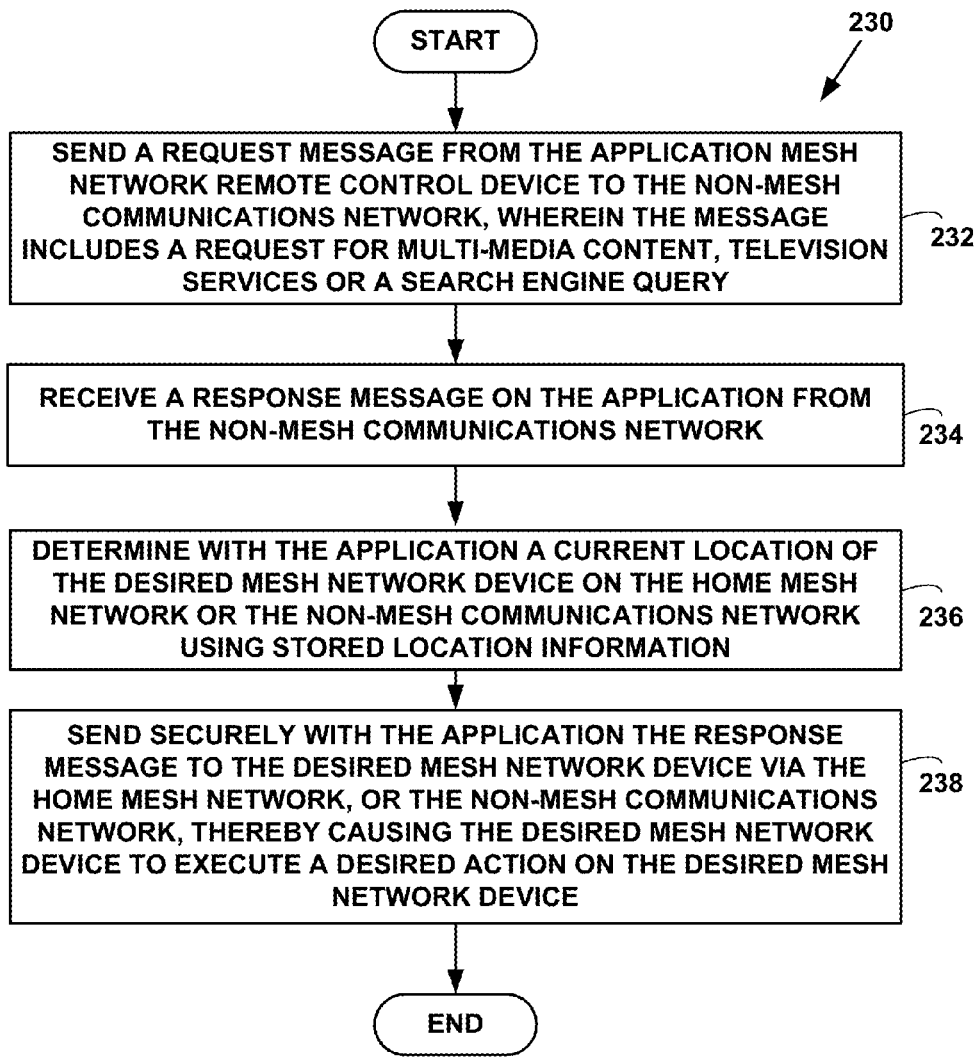

MESH NETWORK REMOTE CONTROL DEVICE

CROSS REFERENCES TO RELATED APPLICATIONS

This application is a Continuation-In-Part (CIP) of U.S. utility patent application Ser. No. 12/884,521, filed on Sep. 17, 2010, which is a CIP of U.S. utility patent application Ser. No. 11/880,271, filed Jul. 20, 2007, that claims priority to U.S. Provisional Patent Application 60/833,741, filed Jul. 27, 2006, said application Ser. No. 11/880,271 issued as U.S. Pat. No. 7,801,058, on Sep. 21, 2010. This application also claims priority to U.S. Provisional application No. 61/331,454, filed May 5, 2010. The contents of all of the cited applications and the issued patent are incorporated by reference.

FIELD OF THE INVENTION

This invention relates to mesh networks, partial mesh networks and/or ad-hoc networks. More specifically, it relates to a mesh network remote control device.

BACKGROUND OF THE INVENTION

There are many types of computer and communications networks in existence. One variety of such networks is a mesh network.

A mesh network is a self-organizing network built from plural mesh network nodes that may spontaneously create an impromptu network, assemble the network themselves, dynamically adapt to device failure and degradation, manage movement of mesh network nodes, and react to changes in task and network requirements. The plural mesh network nodes are reconfigurable smart network nodes that are self-aware, self-reconfigurable and autonomous.

A mesh network is a network that employs one of two connection arrangements, "full mesh" topology or "partial mesh" topology. In the full mesh topology, each node is connected directly to each of the others. In the partial mesh topology, nodes are connected to only some, not all, of the other nodes.

There are a number of problems associated with wired and wireless mesh networks. One problem is that a number of independent mesh devices each make a local decision and then try to combine these decisions at a central point to generate a global decision. Routing, bandwidth, and power constraints determine the quality of the distributed detection and/or estimation decision. Another problem is that is often difficult to determine a load on a mesh network and what resources are required to determine a desired quality of service.

Another problem is that some mesh networks are mobile networks in which it is assumed at least some of the nodes of the network are mobile units that change position over time. The dynamic management of complex routing information is very difficult. Mobile sensor networks include plural client units in such as a personal digital/data assistant (PDA), mobile phone, or other mobile unit for airport lounges, shopping malls, offices, etc.

There have been attempts to solve some of the problems associated with mesh networks. For example, U.S. Pat. No. 6,785,725 entitled "Signaling address resolution in a communication network," that issued to Ramanan teaches "a network configuration and method provide communication setup between neighbor nodes in a communication network, without broadcasting this setup information over the network. A signaling bandwidth separated from the data communication channel bandwidth facilitates address resolution over a common transmission medium. The user is not required to know any physical address properties of the neighbor nodes. This reduces the complexity of the information that a network administrator is required to manage. This processing feeds into a complete address resolution table, which is employed for controlling network communication over the main data communication channel bandwidth. Typically, substantially continuous transmission and/or reception over the signaling bandwidth is useful not only to determine the neighbor node's active address upon startup, but also while the network is running, to detect if a signaling element has been exchanged or has changed activity. The address resolution is automatically updated to reflect a new configuration."

U.S. Published Patent Application No. 20050272430 entitled "Reconfigurable micro-mesh communication system," that was published by Griebling teaches "wide area wireless networks with high network throughput and low provisioning and maintenance costs. The wireless networks comprise a distributed reconfigurable micro-mesh cluster having direct wireless link capability. Multiple channels operating at different frequencies can be used per direct wireless link. To further reduce the provisioning and maintenance costs, narrow beam antennas are used at the point of presence. To expand the wide area wireless networks into the home market, adjustable antennas are installed at homes."

U.S. Published Patent Application No. 20050243765 entitled "Mesh network and piconet work system and method" that was published by Schrader et al. teaches "a method of distributed control of a wireless mesh network without knowledge of global topology. The method includes: a station joining the network with any current member by propagating the join-request, or two meshes merging using the steps of: one mesh joining the other as a whole and then re-synchronizing its timing. The method further includes: first, each station periodically transmits a beacon; second, in response to a beacon being no longer detected, a station transmitting a bitmap of stations that it can still receive; third, each station responds by adding stations that it can receive with all of the bitmaps received from other members, and retransmitting the updated bitmap; fourth, after time for all stations to respond, all stations base current membership on the bitmap. The method further includes: determining sharable time slots that will not interfere with neighbors or other slot sharers, using and then releasing those slots."

U.S. Published Patent Application No. 20050190778 entitled "Multi-system mesh network," that was published by Ozluturk teaches "a transmission is simultaneously provided on multiple mesh networks. Retransmission between two nodes may be performed for the same communication along multiple networks in a mesh topography for the multiple networks. This permits communication to be effected in a mesh topography where one or all systems would not be able to provide a complete network connection within any given system."

U.S. Published Patent Application No. 20050074019 entitled "method and apparatus for providing mobile inter-mesh communication points in a multi-level wireless mesh network," that was published by Handforth et al. teaches "a mobile backhaul inter-mesh communication point forms an interface between a wireless mesh network on a first level and a wireless mesh network on a second, higher bandwidth, level. The two wireless networks are differentiated, e.g., by causing the mesh networks to be formed using different spectra, protocols or coding, or antennae. The mobile intra-mesh communication point functions as an access point in the lower level mesh network and as a relay point in the upper level mesh network. Utilizing mobile inter-mesh communication points facilitates deployment of wireless network access points while enabling the location of access points to follow the concentration of network users. Mobile inter-mesh communication points may be deployed in personal vehicles such as cars, trucks, and motorcycles, public transportation vehicles such as busses, trains, and aircraft, emergency vehicles such as fire trucks and ambulances, and many other types of vehicles."

However, none of these solutions solve all of the problems associated with mesh networks. Thus, it would be desirable to solve some of the problems associated with mesh networks.

SUMMARY OF THE INVENTION

In accordance with preferred embodiments of the present invention, some of the problems associated with mesh networks are overcome. A mesh network device remote control device is provided The mesh network remote control device is able to dynamically exchange information with other mesh network devices via a mesh network, partial mesh network, ad-hoc network or with an non-mesh network such as the Internet or an intranet. The mesh network remote control device controls devices connected to such mesh or non-mesh networks. The mesh network remote control device accepts commands from mesh network devices, non-mesh network devices, communications networks (e.g., URLs, social networking logins, etc.), stores the original commands and transforms the original commands into simple display commands that are used by a user to control remote mesh network or non-mesh network devices.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 10 is a flow diagram illustrating a method of transceiving information on a mesh network device;

FIG. 11 is a flow diagram illustrating a method of transceiving information on a mesh network device; and FIG. 12 is a flow diagram illustrating a method of transceiving information on a mesh network device.

DETAILED DESCRIPTION OF THE INVENTION

Exemplary Mesh Network System

Figure 1:
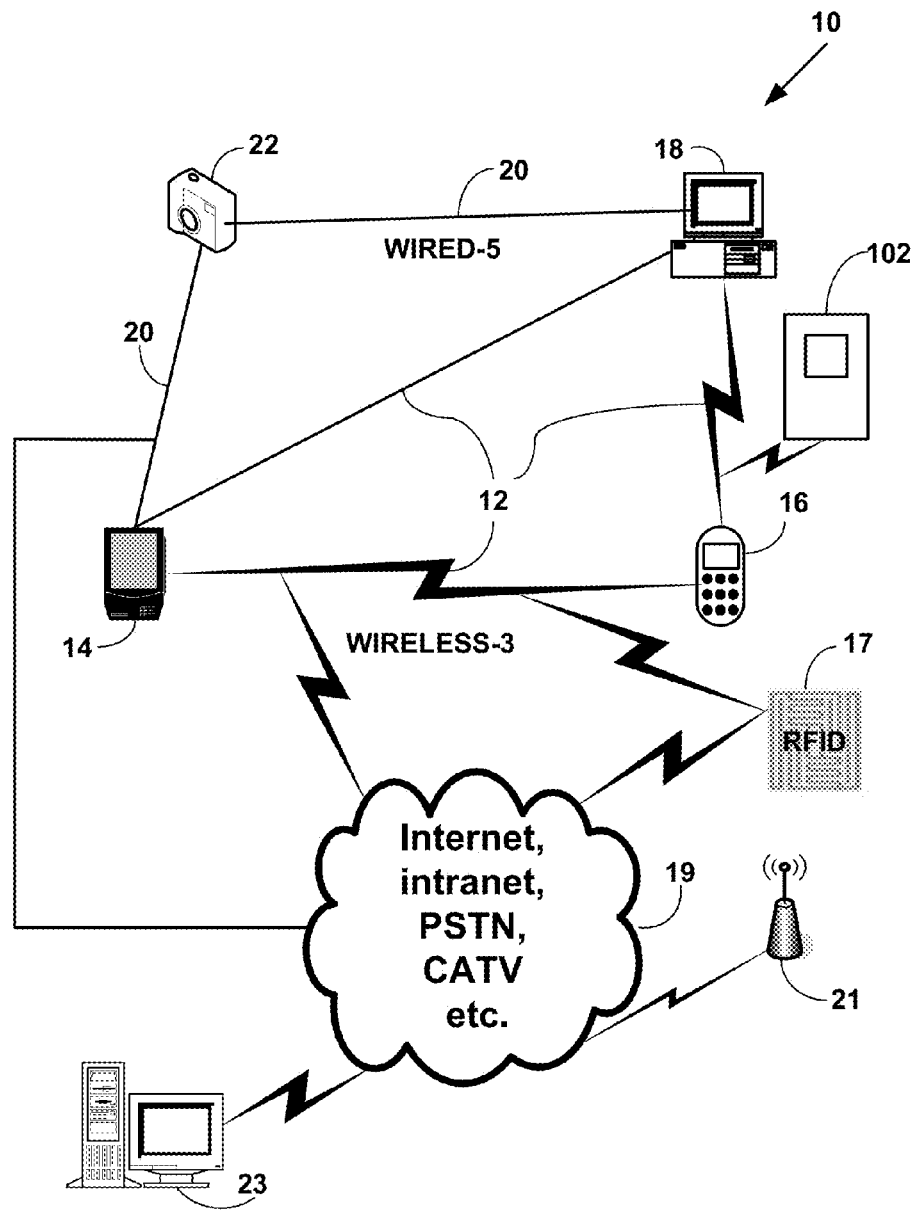
FIG. 1 is a block diagram of an exemplary mesh network.

FIG. 1 is a block diagram of an exemplary mesh network 10. The mesh 12 includes a wireless component 3 and/or a wired component 5. A mesh network is a local area network (LAN) that employs one of two connection arrangements, "full mesh topology" or "partial mesh topology." In the full mesh topology 12, each node is a mesh network device 14, 16, 18 is connected directly to each of the other mesh network device. In the partial mesh topology 20 some mesh network devices 22 are connected to all the others, but some of the mesh network devices 22 are connected only to those other mesh network devices 18 with which they exchange the most data. The connections can be wired or wireless in a mesh 12 network or partial mesh 20 network topologies. A mesh network is reliable and offers redundancy. If one mesh node can no longer operate, all the rest can still communicate with each other, directly or through one or more intermediate nodes. Mesh networks work well when the nodes are located at scattered points that do not lie near a common line.

Some characteristics for mesh networks 12 or partial-mesh networks 20 include a network infrastructure that is decentralized, avoids a central point of failure and control, is cost effective and be maintained and expanded locally. A mesh network 12 or partial mesh network 20 includes many-to-many connections and is capable of dynamically updating and optimizing these connections. The mesh networks 12 or partial-mesh networks 20 include "mobile mesh networks" in which it is assumed that one or more of the mesh network devices dynamically change geographical location over time. Such mesh network devices may continuously change geographical location over time.

The mesh networks 12, 20 may also include embedded mesh network devices that form an "embedded mesh network." An embedded mesh network is typically a component of a larger more complex mesh network. Industrial machines, automobiles, medical equipment, cameras, household appliances, airplanes, vending machines, toys, etc. typically include embedded mesh networks. For example, an automobile may include a first embedded mesh network for anti-lock braking, a second for monitoring and maintaining oil pressure, etc. An embedded mesh network is designed to run on its own without intervention, responds to events (e.g., data collection, data transfer, etc.) in-real time and provides data to the larger more complex network.

The mesh network 12 may also include an "ad-hoc" network. As is known the art an ad-hoc network is a variety of wireless mesh network, and is a self-configuring network of mobile routers (and associated hosts) connected by wireless links, the union of which form an arbitrary topology. The routers are free to move randomly and organize themselves arbitrarily; thus, the network's wireless topology may change rapidly. Such a network may operate in a standalone mesh network fashion, or may be connected to a larger network such as the Internet, an intranet, the Public Switched Telephone Network (PSTN), a cable television (CATV), etc. with a wired or wireless connection. The ad-hoc mesh network includes a mobile ad-hoc network (MANet). The various types of mesh, partial or ad-hoc mesh networks include point-to-point and point-to-multipoint and multipoint-to-point operations.

The plural mesh network devices 14, 16, 18, 22 include, but are not limited to, multimedia capable desktop and laptop computers, facsimile machines, mobile phones, non-mobile phones, smart phones, tablet computers, Internet phones, Internet appliances, personal digital/data assistants (PDA), mobile game console, non-mobile game console, two-way pagers, digital cameras, cable television set-top boxes, digital televisions including high definition television (HDTV) and other types of network devices. The plural mesh network devices 14, 16, 18, 22 also include embedded mesh network devices.

The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television (CATV) formats.

The plural mesh network devices 14, 16, 18, 22 may also include mesh network sensors. A mesh network sensor is a device that receives and responds to a signal or stimulus. For example a mesh network sensor may be used to measure a physical quantity such as temperature, pressure, sound, etc. and convert it into an electronic signal (e.g., digital data, digital signal, etc.). A mesh network sensor may also measure an electrical quantity (e.g., a radio signal, Radio Frequency IDentification signal (RFID) signal, etc.) and convert it into another electronic signal.

In one embodiment, the mesh network sensor is a simple device that includes an electrical circuit and a wired or wireless transceiver. In another embodiment, the mesh network sensor is a complex device (e.g., computer, PDA, mobile phone, etc.) including additional sensor functionality.

The plural network devices 14, 16, 18, 22 include one or more of a wired interface and/or a wireless interface used to connect to a wired 5 and/or a wireless 3 mesh network 12 or partial mesh network 20 to provide voice, video and data communications.

In one embodiment, the exemplary mesh network 10 includes network devices, two of which are illustrated for simplicity (such as a wireless access point 21, server network devices 23, etc. used to connect to non-mesh communications networks 19 (e.g., intranet, Internet, PSTN, etc.).

In one embodiment, the server network device 23 includes a mesh or non-mesh server network device, a gateway, router, switch, wired access point, or Radio Frequency IDentification (RFID) 17 sensor portal, RFID tag portal, or RFID biometric tag portal network device. However, the present invention is not limited to the network devices described and other network devices and/or mesh network devices and/or non-mesh network devices can also be used to practice the invention.

Preferred embodiments of the present invention include mesh network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used. IEEE standards can be found on the World Wide Web at the domain name "www.ieee.org." The ITU, (formerly known as the CCITT) standards can be found at the domain name "www.itu.ch." ETSI standards can be found at the "domain name" "www.etsi.org." IETF standards can be found at the "domain name" "www.ietf.org." The NIST standards can be found at the "domain name" "www.nist.gov." The ANSI standards can be found at the "domain name" "www.ansi.org." Bluetooth Forum documents can be found at the "domain name" "www.bluetooth.com." WAP Forum documents can be found at the "domain name" "www.wap-forum.org." ADSL Forum documents can be found at the "domain name" "www.adsl.com."

An operating environment for devices and interfaces of the present invention include a processing system with one or more high speed Central Processing Unit(s) (CPU) or other processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM)) mass storage system readable by the CPU. The computer readable medium includes cooperating or interconnected computer readable medium, which exist exclusively on the processing system or be distributed among multiple interconnected processing systems that may be local or remote to the processing system.

As is known in the art, the Open Systems Interconnection (OSI) reference model is a layered architecture that standardizes levels of service and types of interaction for computers exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

In one embodiment of the present invention, the wired interfaces include wired interfaces and corresponding networking protocols for wired connections to the Public Switched Telephone Network (PSTN) or a cable television network (CATV) including HDTV that connect the network devices 14, 16, 18, 22 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others.

In one embodiment, of the invention, the wireless interfaces include WPAN wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, two-way pager, etc.)

Typically, a wireless personal area network uses some technology that permits communication only within about 10 meters. One such technology is "Bluetooth." Another such technology is "Zigbee."

A key concept in WPAN technology is known as "plugging in." In the ideal scenario, when any two WPAN-equipped devices come into close proximity (within several meters of each other) or within a few kilometers of a central server (not illustrated), they can communicate via wireless communications as if connected by a cable. WPAN devices can also lock out other devices selectively, preventing needless interference or unauthorized access to secure information.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (Wi-Fi), "Worldwide Interoperability for Microwave Access" (WiMAX), ETSI High Performance Radio Metropolitan Area Network (HIPERMAN) "RF Home," or other types of wireless interfaces. However, the present invention is not limited to such wireless interface and other types of wireless interfaces can also be used.

In another embodiment of the present invention, the wireless mesh network device 14, 16, 18, 22 includes a wireless sensor device that comprises an integral or separate Bluetooth and/or infra data association (IrDA) module for wireless Bluetooth or wireless infrared communications.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is a type of 802.11 xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the "domain name" "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the "domain name" "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the "domain name" "www.wimax-forum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the "domain name" "www.etsi.org." ETSI HIPERMAN can be used to provide a WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

Security and Encryption

Devices and interfaces (e.g., security interface 46) of the present invention include plural security and/or encryption methods for secure communications. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11x WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the "domain name" "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, IP is an addressing protocol designed to route traffic within a network or between networks. For more information on IP 54 see IETF RFC-791 incorporated herein by reference.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768 incorporated herein by reference.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digistal signatures. The security method are negotiated between the source and destination at the start of establishing a protocol session. The SSL 2.0 protocol specification, by Kipp E. B. Hickman, 1995 is incorporated herein by reference. More information on SSL is available at the "domain name" See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

Exemplary Mesh Network Device

Figure 2:
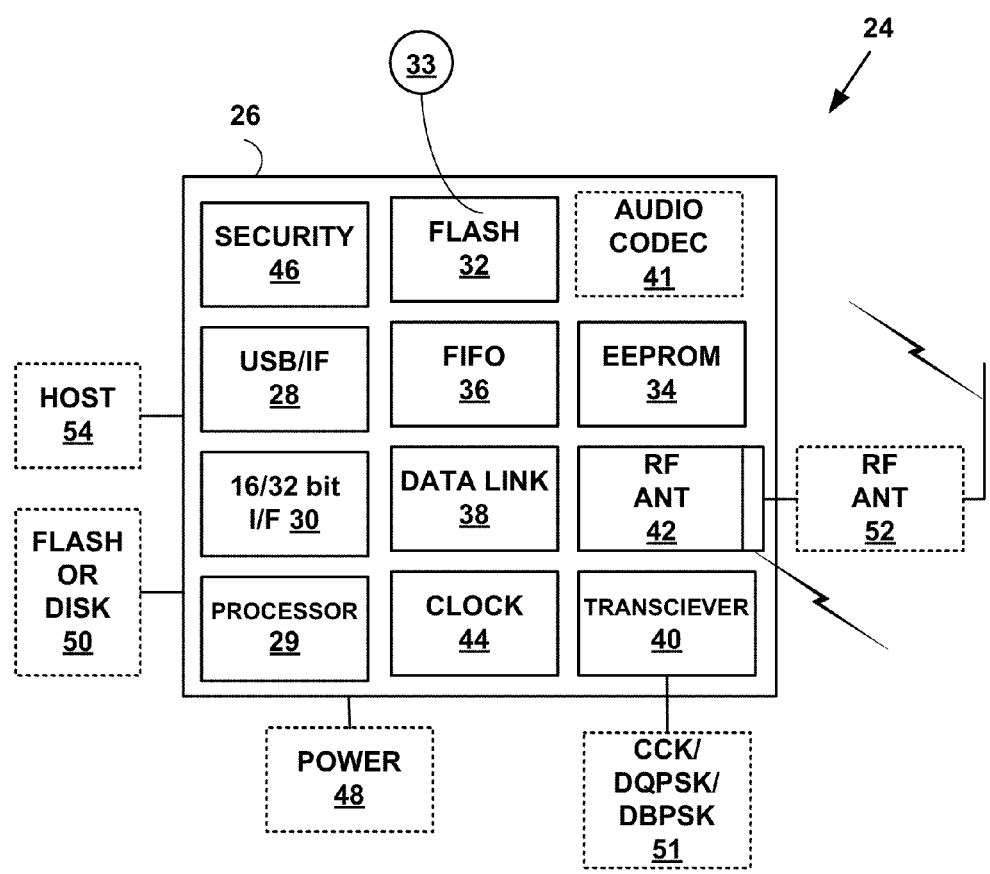
FIG. 2 is a block diagram of an exemplary hardware architecture for an mesh network device.

FIG. 2 is a block diagram illustrating an exemplary mesh network device architecture 24. The architecture 24 includes, but is not limited to, a mesh network device 26 comprising a universal serial bus (USB) interface (UF) 28, one or more processors 29, a selectable communications bit-interface (e.g., 16/32 bit) 30, a flash memory 32, an erasable electronically programmable read only memory (EEPROM) 34, a first-in-first-out (FIFO) buffer 36, a data-link chip 38 (e.g., Medium Access Control (MAC) chip, etc.), a wireless transceiver (e.g., Zigbee, Bluetooth, WiMax, etc.) 40, a wireless Radio Frequency (RF) antenna 42, a clock 44, and a security interface 46.

The flash memory 32 and/or the EEPROM 34 are non-volatile and may include one or more applications 33 (only illustrated in flash memory for simplicity) including one or more software and/or firmware and/or hardware modules used for mesh and non-mesh networking (e.g., TCP/IP/UDP, etc.), security or for other purposes. In one embodiment, the security interface 46 is not a separate hardware interface but includes one more software modules included in the EEPROM 34 or in the flash memory 32.

As is known in the art, a "baseband" transceiver is a transceiver in which information is carried in digital form in one or more channels on a transmission medium. A baseband includes any frequency band on which information is superimposed, whether or not a frequency band is multiplexed and on which digital information can be sent on sub-bands.

In one embodiment, the mesh network device 26 further comprises an external power source 48 (e.g., via USB, etc.), an external flash memory or external disk drive 50, an external wireless radio frequency (RF) front end 52 (e.g., a wireless RF antenna, etc.) and an external host network device 54 (e.g., computer, PDA, mobile phone, etc.). The external flash or disk drive 50 includes, but is not limited to, a removable device such as a Compact Flash (CF), Secure Digital Card (SD), Memory Stick (MS), Micro Drive, MultiMediaCard (MMC) xD-Picture Card (xD), SmartMedia (SM) card or other removable device. However, the present invention is not limited to this embodiment and more, fewer or other components can also be used to practice the invention.

In one embodiment, the mesh network device 26 includes Complementary Code Keying (CCK) and/or includes differential quadrature phase shift keying (DQPSK) and/or differential binary phase shift keying (DBPSK) encoders 51.

As is known in the art, Complementary Code Keying (CCK) is a modulation scheme used with wireless networks (WLANs) that employ the IEEE 802.11b specification. A complementary code includes a pair of finite bit sequences of equal length, such that a number of pairs of identical elements (e.g., one or zero) with any given separation in one sequence are equal to a number of pairs of unlike elements having the same separation in the other sequence.

In one embodiment, the mesh network device 26 includes differential quadrature phase shift keying (DQPSK). DQPSK modulates using differential quaternary phase shift keying. DQPSK transmits only differences between values of a phase of a sin wave, rather than a full absolute value. DQPSK makes use of two carrier signals, separated by 90-degrees. The output is a baseband representation of the modulated signal.

In one embodiment, the mesh network device 26 includes differential binary phase shift keying (DBPSK). DBPSK modulates using the differential binary phase shift keying. DBPSK maps phase differences of $\theta$ and $\pi+\theta$, respectively, to outputs of zero and one, respectively, where $\theta$ is a phase rotation parameter. The output is a baseband representation of the modulated signal.

In one embodiment, the mesh network device 26 includes Orthogonal frequency division multiplexing (OFDM). OFDM is also called discrete multi-tone modulation (DMT) and is a transmission technique based upon the idea of frequency-division multiplexing (FDM) where multiple signals are sent out at different frequencies. OFDM uses a composite of narrow channel bands to enhance its performance in high frequency bands (such as 5.x GHz) in urban and rural applications where building clutter and foliage can negatively impact the propagation of radio waves for wireless devices.

In one embodiment, the mesh network device 26 includes Carrier Sense Multiple Access/Collision Avoidance (CSMA/CA). CSMA/CA is a data-link layer protocol used in the data-link chip 38 for carrier transmission in 802.11xx networks. CSMA/CA acts to prevent collisions before they happen.

In one embodiment, the mesh network device 26 is an internal device to a mesh network device 12, 14, 16, 22. In another embodiment, the mesh network device an external portable removable device as illustrated in FIG. 3. However, the present invention is not limited to such an embodiment and other embodiments can be used to practice the invention.

In one embodiment, mesh network device 26 includes one or more audio codecs (encoder/decoder) 41 including, but not limited to a voice encoder and/or a voice decoder compliant ITU-T G.711, G.722, G.723, G.728 and G.729 standards, the contents of which are incorporated herein by reference. Global System for Mobile Communications (GSM) codecs can also be used. In such an embodiment, the mesh network device 26 can accept voice commands or other audio inputs such as those from an animal (e.g., dog bark from a service dog, etc.) and/or an RF signal and/or an RF from an RFID tag 17, etc.

FIG. 3 is a block diagram illustrating an outer view 58 of a specific exemplary implementation 58 of the mesh network device 26 of FIG. 2.

Figure 3A:
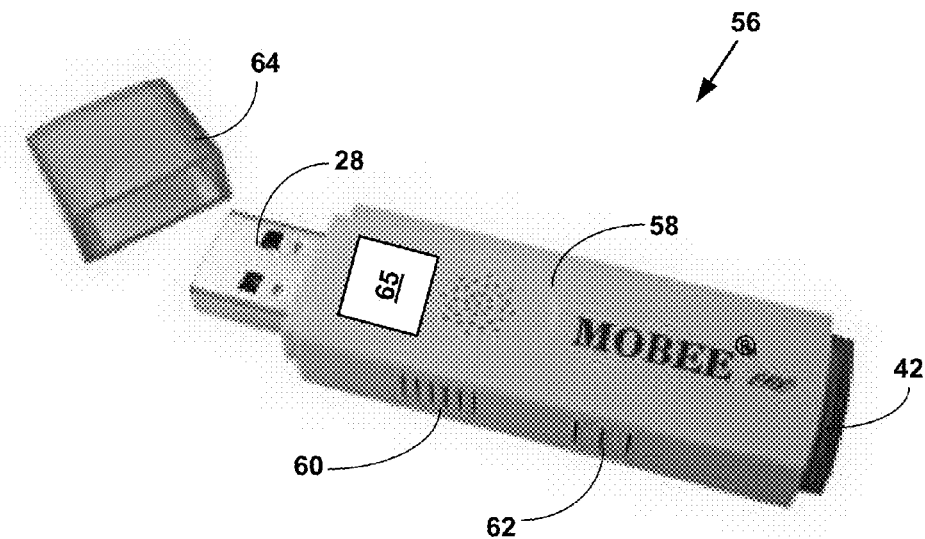
FIG. 3A is a block diagram illustrating a specific exemplary implementation of the mesh network device of FIG. 2.
Figure 3B:
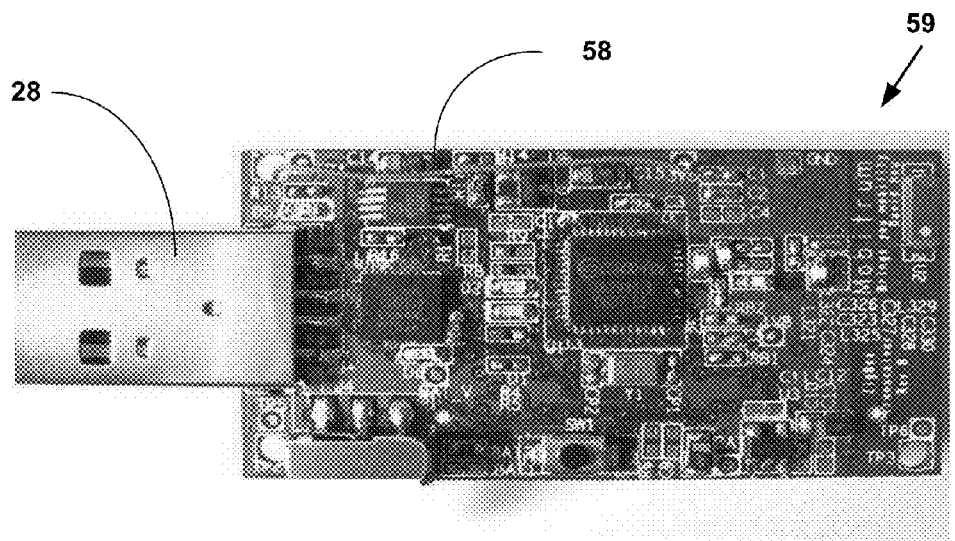
FIG. 3B is a block diagram illustrating a specific exemplary implementation of the mesh network device of FIG. 3A.

FIG. 3B is a block diagram illustrating an inner view 59 specific exemplary implementation 58 of the mesh network device of FIG. 3A.

In one embodiment, the mesh network device 58 further comprises a first light emitting diode (LED) 60 indicating when the mesh network device is connected to a mesh network or partial mesh network and a second LED 62 indicating whether the mesh network device is active. The mesh network device 58 further includes a cover 64 for the USB interface 28.

In one specific exemplary embodiment, the mesh network device 58 is called "MOBEE™" and is a self-contained USB based-mesh network device for exchanging multimedia content between mesh network devices (e.g., host devices, PC/Laptop/PDA/Smart Phone/Mobile/Smart Home devices, etc.) through a meshed mobile network to maximize communication portability.

In one embodiment, a mesh network device 26, 58 further includes a Smart Transducer Interface Modules (STIM) with an Ultra wideband transceiver (e.g., in a physical layer), a mesh network protocol adapter (e.g., in a data-link layer (e.g. MAC layer, with CCK, DBPSK, OFDM encoding etc.)) and authentication and encryption software (e.g., in data-link layer).

Ultra-wideband (UWB) refers to a radio communications technique based on transmitting very-short-duration pulses, often of duration of only nanoseconds or less, whereby the occupied bandwidth goes to very large values.

In another embodiment, the mesh network device 58 includes a Wireless Sensor Portal (WSP) with a Thin Film Transistor (TFT) high-resolution user graphic interface (GUI) 65 for displaying WSP information and sensor topology information and an Organizing Agent (OA). The OA manages the WSP and TFT. The OA is also responsible for collecting and organizing sensor data in a fashion that allows for a particular class of mesh network queries to be answered. However, the present invention is not limited to these embodiments and other embodiments can also be used.

As is known in the art, a TFT is type of LCD flat panel display screen in which each pixel is controlled by one to four transistors. TFT displays are sometimes called active matrix Liquid Crystal Diodes (LCDs).

In one exemplary embodiment, the mesh network device 26, 58 is a tiny device that integrates at least three elements together: (1) a wireless baseband or ultra wideband module 40 such as 802.11g/b/a, 802.15.4 (ZigBee), Bluetooth, Ultra wideband 802.16x, etc.c (2) a flash memory 32; and (3) an external power source 46. The mesh network device 26, 58 may further include an external removable memory module 48 such as a Secure Digital (SD) card, Pro Multimedia Card (MMC), Memory Stick (MS), Microdrive, XD card or other external storage cards. However, the present invention is not limited to this embodiment and more, fewer or other components can also be used to practice the invention.

In one embodiment the mesh network device 26, 58 includes at least the features illustrated in Table 1. However, the present invention is not limited to the features listed in Table 1 and more, fewer or other components can also be used to practice the invention.

TABLE 1

Wireless module such as: IEEE802.11a/b/g, IEEE 802.15.4 (ZigBee), Bluetooth, Ultra wideband, or IEEE 802.16 (WiMAX)
Wireless + NAND Flash combo solution with external removable Flash memory such as Secure Digital (SD) card, Pro Multimedia Card (MMC), Memory Stick (MS), Microdrive, and XD.
Mesh networking and WPAN software
USB 2.0 interface and compatible with USB 1.1
IEEE 1394
TCP/IP/UDP/HTTP/HTTPs
Programmable wireless RF interface
High level security includes, but are not limited to, WEP64/128/256, WPA (HW TKIP support) and AES128.
Auto-installation function
Software wireless access point In another embodiment, the specific implementation 58 of the mesh network of FIG. 3 includes at least the features illustrated in Table 2. However, the present invention is not limited to the features listed in Table 2 and more, fewer or other components can also be used to practice the invention.

TABLE 2

| | |
|---|---|
| Wireless Standards | IEEE 802.11b/g, 802.15.4 |
| Host Interface 28 | USB 2.0 Plug and Play |
| Wireless Antenna Connector 42 | Chip Antenna |
| Frequency Range | 2.412 GHz-2.4835 GHz |
| Number of Selectable Channels | USA, Canada: 11 channels Europe: 13 channels Asia (e.g, Japan): 14 channels |
| Modulation Techniques | Direct Sequence Spread Spectrum (CCK, DQPSK, DBPSK) Orthogonal frequency division multiplexing (OFDM) |
| Security 46 | 64/128/256 bit WEP, WPA, WPA2, CCX1.0, CCX2.0, 802.1x |
| Data-Link 38 Protocol | CSMA/CA (Collision Avoidance) with acknowledgment |
| Output RF Power | 11g: 13 dBM 11b: 16 dBM |
| Sensitivity | −71 dBM@54 Mbps −84 dBM@11 Mbps |
| Data Rate | 802.11g (54 Mbps, 48 Mbps, 36 Mbps, 24 Mbps, 18 Mbps, 12 Mbps, 9 Mbps, 6 Mbps) 802.11b (11 Mbps, 5.5 Mpbs, 2 Mbps, 1 Mbps) |
| Throughput | 33 Mbps @ 11g + mode 24 Mbps @ 11g mode |
| LEDs 58, 60 | Link: Green Active: Green |

TABLE 2-continued

| | |
|---|---|
| Weight | 10 g |
| Dimensions | 71.5 mm(L) × 19 mm (W) × 9 mm (H) |
| Power 48 Requirements | Operating Voltage: 5 V DC<br>Continuous TX Current: 350 mA @54 Mbps<br>Continuous TX Current: 330 mA @11 Mbps<br>Continuous RX Current: 245 mA<br>Typical Current 240 mA |

Exemplary Mesh Network Device Method of Use

Figure 4:
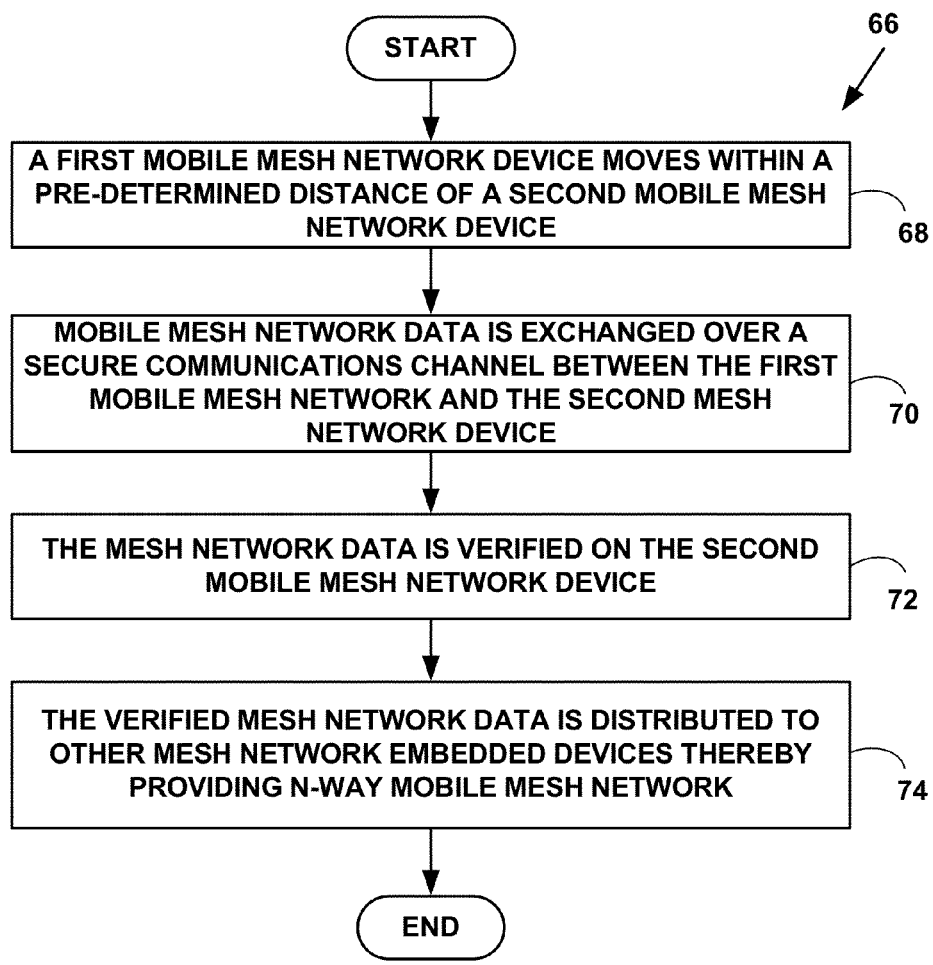
FIG. 4 is a flow diagram illustrating a method for mesh networking.

FIG. 4 is a flow diagram illustrating a Method 66 for mobile mesh networking. At Step 68, a first mobile mesh network device (e.g., 14) moves within a pre-determined distance of a second mobile mesh network device (e.g., 16), wherein the second mobile mesh network device 16 is also moving. At Step 70, mobile mesh network data is exchanged over a secure communications channel between the first mobile mesh network 14 and the second mesh network device 16. At 72, the mesh network data is verified on the second mobile mesh network device. At Step 74, the verified mesh network data is distributed to other mesh network devices (e.g., 18), if any, on the mesh network 12, thereby creating an N-way mobile mesh network 12 between the plural network devices 14, 16, 18.

Method 66 is illustrated with an exemplary embodiment. However, the present invention is not limited to such and embodiment and other embodiments can also be used to practice the invention. In such an exemplary embodiment at Step 68, a first mobile mesh network device (e.g., 14) moves within a pre-determined distance of a second mobile mesh network device (e.g., 16). The first mobile mesh network device 14 and the second mobile mesh network device 16 include implementations 26, 58 described above.

At Step 70, mesh network data is exchanged over a secure communications channel between the first mobile mesh network 14 and the second mesh network device 16 to create a mobile mesh network 12. The mesh network data includes, but is not limited to, routing data, spatial data, mesh network load data and other mesh network data.

At 72, the mesh network data is verified o the second mesh network device 16. The verification includes verifying routing paths, spatial data, mesh network load data and other mesh network data.

At Step 74, the verified mesh network device is distributed to other mesh network devices (e.g., 18), if any, on the mesh network 12, thereby creating an N-way mobile mesh network 12 between the plural network devices 14, 16, 18.

Figure 5:
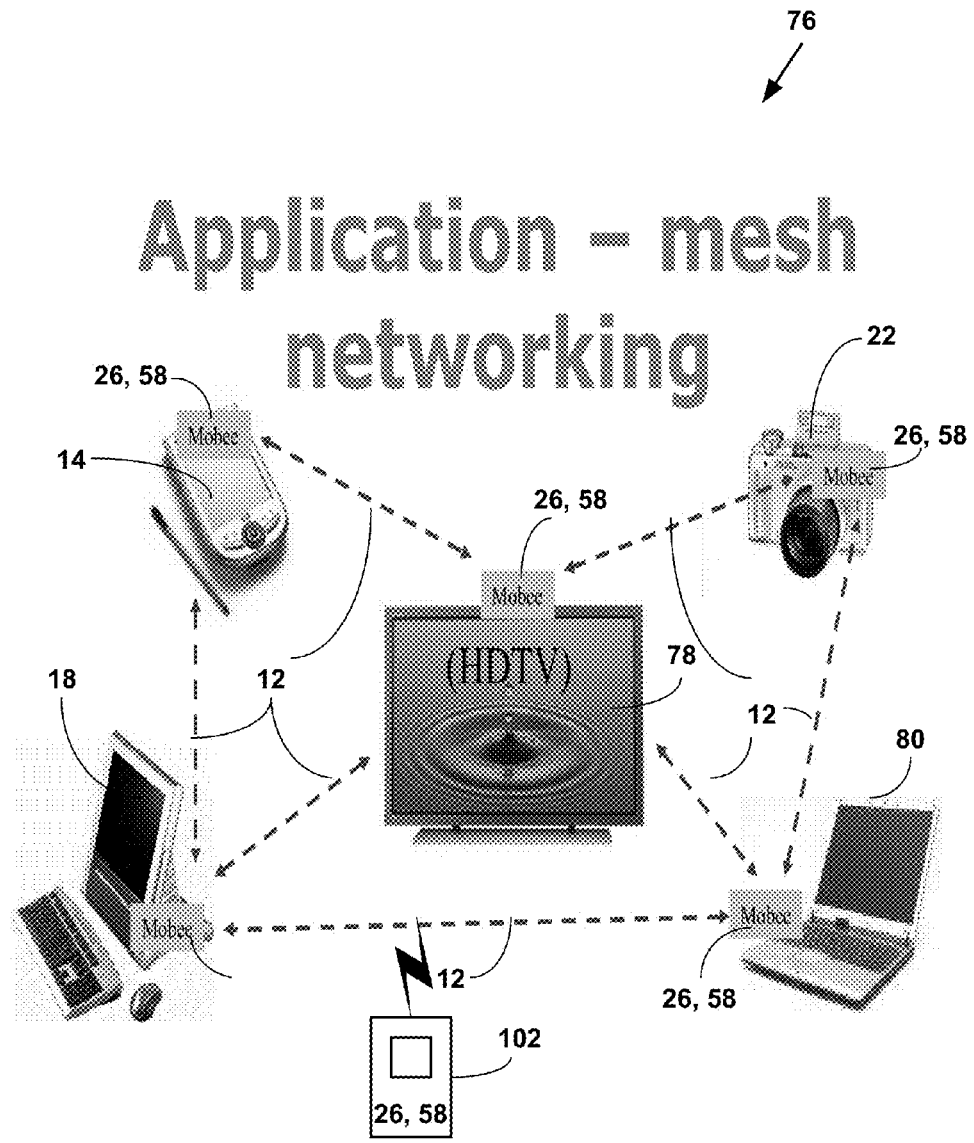
FIG. 5 is a block diagram illustrating an N-way mesh network formed using the mesh network device of FIG. 2.

FIG. 5 is a block diagram 76 illustrating an N-way mesh network formed using the mesh network device of FIG. 2. FIG. 5 illustrates two additional network devices including a television 78 and a laptop computer 80. The network devices 14, 16, 18, 22, 78, 80 in FIG. 5 are attached to the mesh network device 26 that is used to create an N-way mesh network. FIG. 5 illustrates a full mesh topology 12. However, the mesh network devices 26,58 can also be used to form a partial mesh topology 20 (not illustrated in FIG. 4). Television 78 includes, but is not limited to, a High-Definition Television (HDTV), an Internet ready HDTV and other types of televisions.

Wireless Mesh Sensor Networks

Wireless sensor networks provide distributed network and Internet access to sensors, controls, and processors that are deeply embedded in equipment, facilities, and the environment. Wireless sensor networks provide monitoring and control capability for applications in transportation, manufacturing, health care, environmental monitoring, and safety and security. Wireless sensor networks provide low power signal processing, low power computation, and low power, low cost wireless networking capability in a compact system. Wireless sensor networks provide sensing, local control, and embedded intelligent systems in structures, materials, and environments.

In one embodiment, the mesh network device 26, 56 is an embedded mesh network device. In another embodiment, the mesh network device 26, 56 is a wireless mesh network sensor to collect and monitor spatial data. In such an embodiment, the mesh network device 26, 56 may include only selected ones of the components illustrated in FIG. 2 to make the wireless mesh sensor device simpler, smaller and less expensive.

Mesh sensor networks are used to determine spatial data including the location of objects. Location prediction is used to determine locations of a spatial phenomenon from maps of other spatial features such as building walls, natural phenomenon such as mountains, etc.

The method and system described herein also integrate wireless and wired sensor data acquisition for distributed sensing and monitoring for example, for rocket propulsion testing, agricultural efficiency, coastal management, disaster management, ecological forecasting, energy management, homeland security, and detecting ice accretion and detection of emissions, air quality, other data sensed around specific environments and other applications.

The method and apparatus described herein can be used for at least these exemplary applications: (1) Sensing and monitoring for Aircraft—icing on wings—data from heaters and sensors; (2) Aircraft emissions—collection of data around airports; (3) Verification and validation of equipment (e.g., Radio Frequency Identifiers "RFID"); and (4) Security—geo-location and personal location. However, the present invention is not limited to these applications and the present invention can be applied to other applications.

The method and apparatus described herein may provide at least the following advantages: (1) Spatial data is Extremely Difficult to Intercept—Wideband pulsed radar spreads the signal and allows more users access to a limited amount of scarce frequency spectrum, thus allowing spectrum reuse; (2) Multipath Immunity—A low path loss and low energy density minimizes interference to other services. UWB is very tolerant of interference, enabling operation within buildings, urban areas, and forests; (3) Precision Network-wide timing—Real-time, continuous position location down to a centimeter of resolution results in precision geolocation systems (4) Low Cost—Requires minimal components resulting in small size and weight; (5) Low Power—Typical consumption is in microwatts; and (6) Antennas—Can be very small (2 cm) because they are non-resonant.

Mesh Network Device Dynamic Information Exchange

Figure 6:
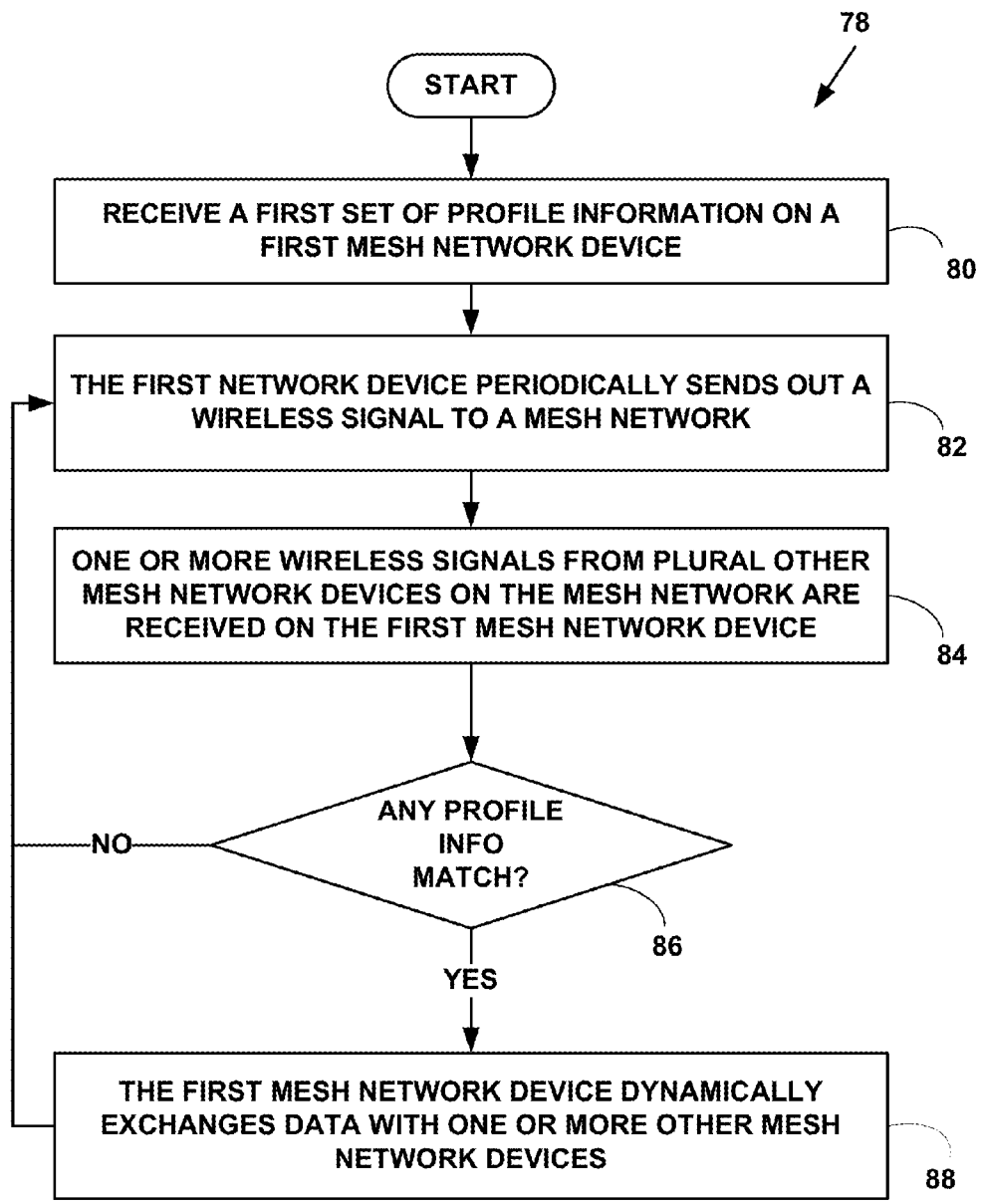
FIG. 6 is a flow diagram illustrating a method for dynamic information interchange for mesh network devices.

FIG. 6 is a flow diagram illustrating a Method 78 for dynamic information interchange for mesh network devices. At Step 80, a first set of profile information is received on a first mesh network device. At Step 82, a wireless signal is periodically sent from the first network device to a mesh network including plural other mesh network devices including other sets of profile information. At Step 84, one or more wireless signals from the plural other mesh network devices on the mesh network are received on the first mesh network device. The one or more wireless signals include other sets of profile information stored on the plural of other mesh network devices. At Step 86, a test is conducted to determine from the received one or more wireless signals whether any items in first set of profile information on the first network device match any items in other sets of profile information stored on the plural other mesh network devices. At Step 88, if any profile items match, a set of data is exchanged between the first network device and the one or more other mesh network devices via the mesh network.

Method 78 is illustrated with one exemplary embodiment. However, the present invention is not limited to such an embodiment and other embodiments can also be used to practice the invention.

In such an exemplary embodiment at Step 80, the mesh network device 56 is equipped with a short-range wireless module and flash memory as is illustrated in FIGS. 2 and 3. In another embodiment, the small mesh network device is embedded within an audio player (e.g., MP3 player, etc.) or other popular handheld devices.

At Step 80, the profile information includes, but is not limited to, an e-mail address, an IP address, a hardware address (e.g., Medium Access Control (MAC) address, etc.), a URL, a name, an address, an telephone number, an instant message identifier, a text message identifier, a encryption key, a digital signature, a secure message digest, a security identifier, a mesh network identifier or other types of profile information such as advertisements, public or emergency notices, location specific information including location-aware information. However, the present invention is not limited to such profile information and other profile information can also be used.

At Step 80, a user profile is entered or edited through a template stored on the mesh network device 56 or via a web-site on a server network device 23 on the mesh network 12 or on another public or private network such as the Internet or an intranet. The user profile is saved to the first mesh network device 56 via USB connection. Personal information is stored in the flash 32. The user of the mesh network device selects one, several or all of the items in the user profile to match to user profiles in other mesh network devices. The profile information may also be entered through the display 66.

At Step 82, a wireless signal is periodically sent out via the wireless antenna 42 periodically to the mesh network 12. (e.g., sent out to other mesh network devices up to 10 meters away).

The user profile includes virtually any type of information such as, gender, age, Looking for . . . , Hobby, e-mail address, home address, home telephone number, work information, advertising, etc.

At Step 84, one or more wireless signals from the plural other mesh network devices 56', 56" on the mesh network 12 are received on the first mesh network device 56. The one or more wireless signals include other sets of profile information stored on the plural of other mesh network devices 56', 56".

At Step 86, a test is conducted to determine if the first set of profile information matches any other sets of profile information stored on other mesh network devices 56', 56", and if so, the first mesh network device 56 exchanges a set of data with the one or more other mesh network devices 56', 56".

At Step 88, when a mesh network device 56' 56", etc. matches any selected information (one, several, all items) in the first mesh network device 56, data is dynamically exchanged wirelessly and stored on each other's Flash memory in the mesh network devices. In one embodiment, the data is securely exchanged using a pre-determined security and/or encryption method.

The received data is retrievable via display 66, a computer or other interface (e.g., web-site page, etc.). The data dynamically exchange includes one, several or all items stored in the profile and/or other types of data stored on the mesh network devices. For example, a user of the first mesh network device 26, 56, may wish to dynamically exchange audio files such as MP3 files, etc. with a friend's mesh network device 26', 56'. At Step 88, the two mesh user devices 26, 56 and 26' and 56' may exchange MP3 files based on a set of designated e-mail addresses (e.g., the first user's and the friend's e-mail, etc.).

As is known in the art Motion Picture Expert Group (MPEG) Audio Layer 3, more commonly referred to as "MP3," is a popular encoding format for audio information.

In such an example both the user profile on the first mesh network device 26, 56 and the friend's mesh network device 26', 56' may include both e-mail addresses. In another embodiment, the user profiles may only include one designated e-mail address (e.g., the e-mail address of the user of the first mesh network device, etc.).

Figure 7:
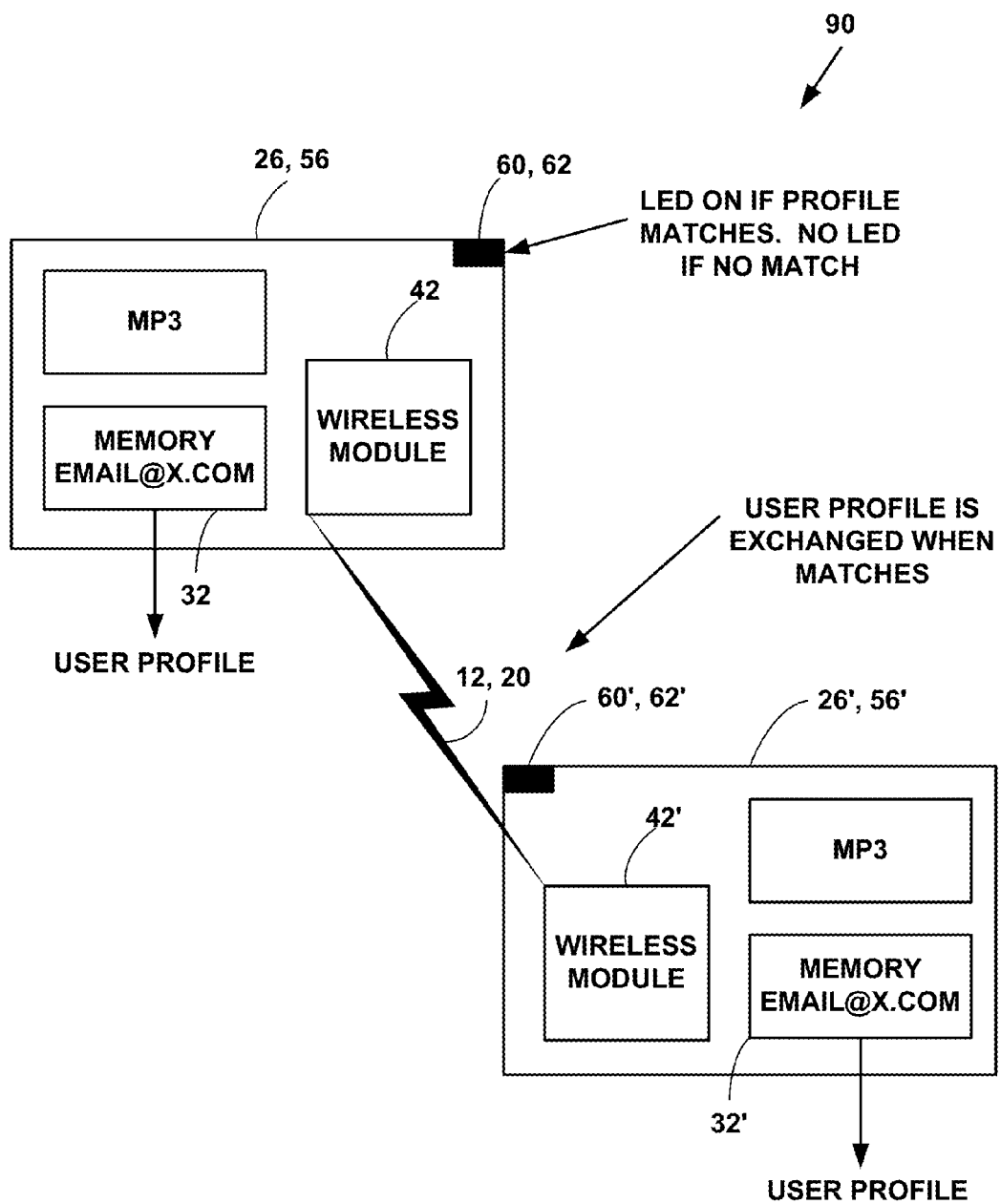
FIG. 7 is a block diagram illustrating a data flow for dynamic information interchange for mesh network devices.

FIG. 7 is a block diagram illustrating a data flow 90 for dynamic information interchange for mesh network devices using Method 78.

Figure 8:
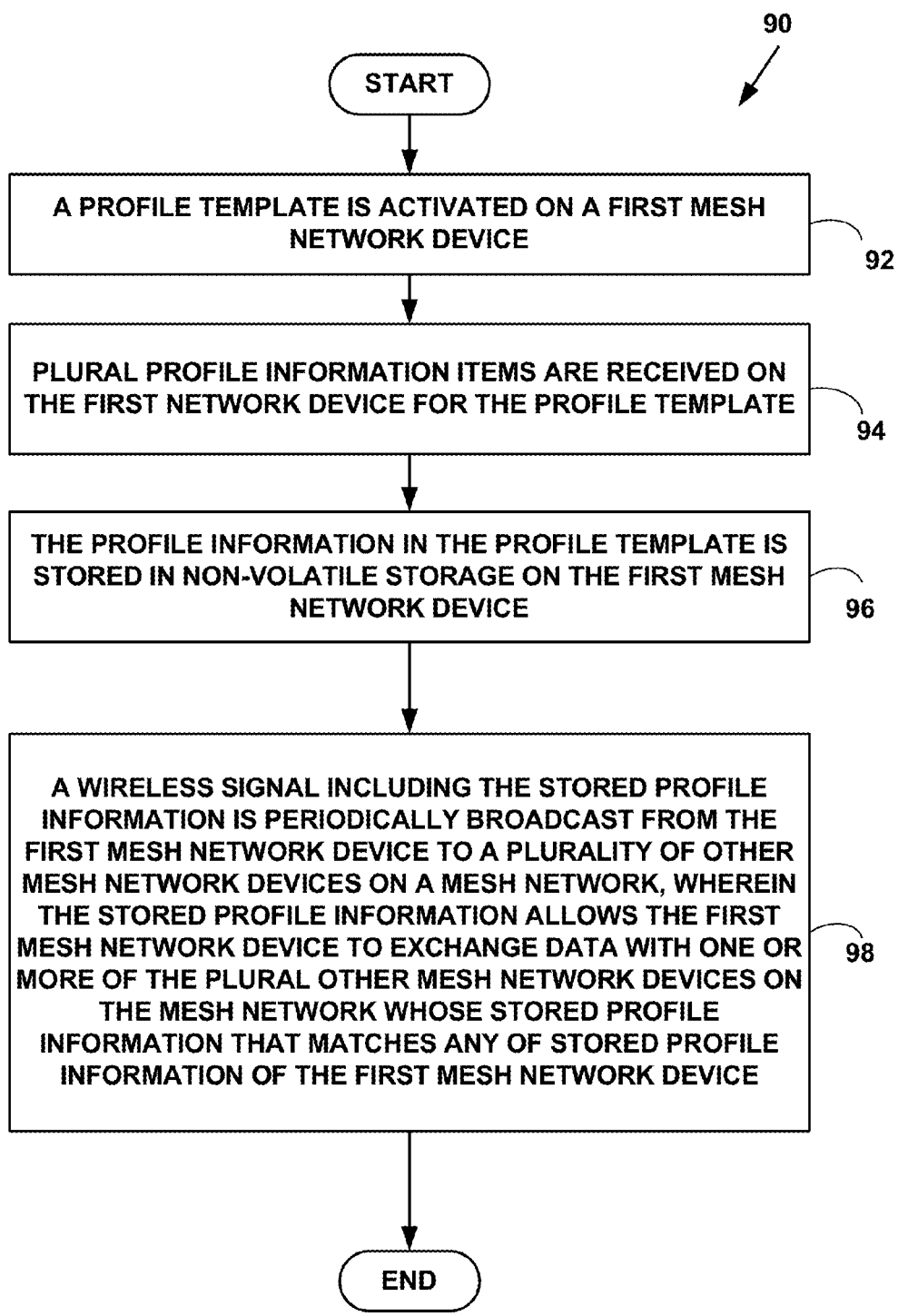
FIG. 8 is a flow diagram illustrating a method for enabling dynamic information interchange for mesh network devices.

FIG. 8 is a flow diagram illustrating a Method 90 for enabling dynamic information interchange for mesh network devices. At Step 92, a profile template is activated on a first mesh network device. At Step 94, plural profile information items are received on the first network device for the profile template. At Step 96, the profile information in the profile template is stored in non-volatile storage on the first mesh network device. At Step 98, a wireless signal including the stored profile information is periodically broadcast from the first mesh network device to plural other mesh network devices on a mesh network. The stored profile information allows the first mesh network device to exchange data with one or more of the plural other mesh network devices on the mesh network whose stored profile information that matches any of stored profile information of the first mesh network device.

Method 90 is illustrated with one exemplary embodiment. However, the present invention is not limited to such an embodiment and other embodiments can also be used to practice the invention.

In such an exemplary embodiment at Step 92, a profile template is activated on a first mesh network device 26, 56. In one embodiment the profile template is activated when a user plugs the mesh network device 26, 56 in a USB port on a computer or other device. In such an embodiment, flash 32 or EEPROM 34 includes a URL to allow the first mesh network device to obtain a profile template. The URL is used to access the profile template at another location on the mesh network 12. In such an embodiment, a user is directed via the URL to a user login page or web page from which the user is allowed to obtain, view and fill a profile template.

In another embodiment, at Step 92 the profile template is stored directly in flash 32 or EEPROM 34 of the first mesh network device 26, 56 and is activated as part of an initialization sequence for the first mesh network device 26, 56. In such an embodiment, the profile template can be re-activated at a later time to change profile items. In one embodiment, the profile template is securely stored using a pre-determined security and/or encryption method.

In either embodiment, the profile items can be viewed via display 65 or via host 54 (e.g., a user computer via a USB port, etc).

At Step 94, plural profile information items are received on the first network device 26, 56 for the profile template. In one embodiment, the profile information items are entered via a user-friendly Hyper Text Markup Protocol (HTML) or eXtensible Markup Language (XML) based-web page. However, the present embodiment is not limited to this embodiment and the profile information items can be entered via other means.

At Step 96, the profile information in the profile template is stored in non-volatile storage (e.g., flash 32, etc.) on the first mesh network device 26, 56. The profile information may also be stored in other devices (e.g., a mesh network server 23, etc.) on other locations on the mesh network 12. For example, if the profile template was activated via a URL, the profile template items may also be stored on the device identified by the URL.

At Step 98, a wireless signal including the stored profile information is periodically broadcast from the first mesh network device 26, 56 to plural other mesh network devices 56', 56" on the mesh network 12. The stored profile information allows the first mesh network device to exchange data with one or more of the plural other mesh network devices on the mesh network whose stored profile information that matches any of stored profile information of the first mesh network device using Method 78 and other methods.

A mesh network device with integrated features creates an N-way mesh network with a full mesh network topology or a partial mesh network or an ad-hoc network topology. The mesh network device is able to dynamically exchange information with other mesh network devices using stored profiles (e.g., personal data, advertisements, instant coupons, location-aware information, etc.) via a mesh network or partial mesh network or ad-hoc network.

The present invention provides a mesh network remote control device 102 that accepts commands from mesh network devices, non-mesh network devices, communications networks (e.g., URLs, etc.), stores the original commands and transforms the original commands into simple display commands that are used by a user to control remote mesh network or non-mesh network devices. The mesh network remote control device 102 is able to dynamically exchange information with other mesh network devices 14, 16, 18, 22, 78, via a mesh network, partial mesh network, ad-hoc network or with an non-mesh network 19 such as the Internet or an intranet.

Mesh Network Remote Control Device

Figure 9:
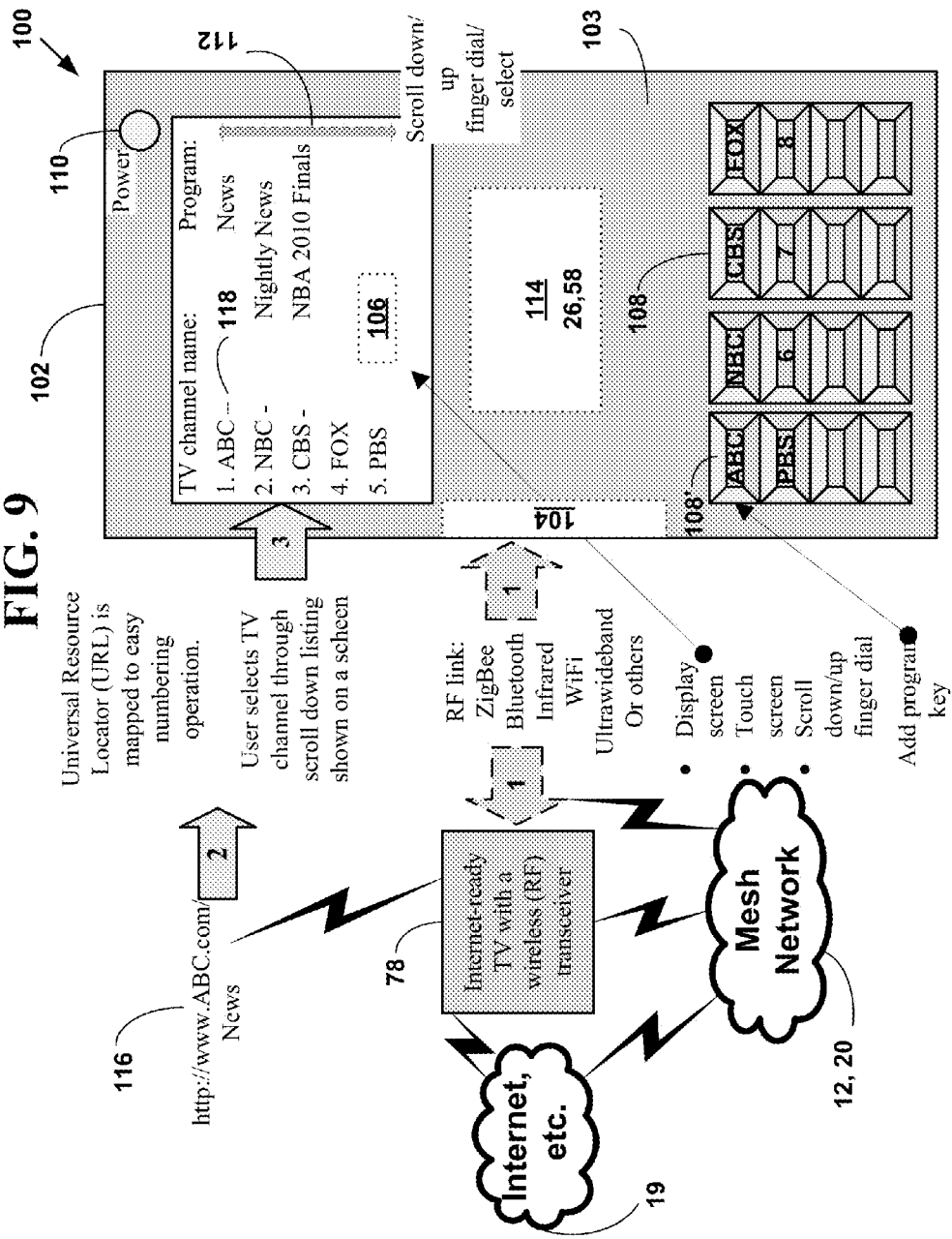
FIG. 9 is a block diagram illustrating a mesh network remote control device.

FIG. 9 is a block diagram 100 illustrating a mesh network remote control device 102 (26, 28) for controlling mesh network devices 14, 16, 18, 22 and non-mesh network devices. The mesh network remote control includes a remote control case 103, a wireless transceiver 104, a display component 106, plural remote control key buttons 108, a power switch 110, a finger touch scroll component 112 and internal controlling components 114. However, the present invention is not limited to such a mesh network remote control device and more, fewer or other components can be used in the device to practice the invention.

In one exemplary embodiment, mesh network remote control device 102 includes mesh network device 26 FIG. 2 and/or 28 FIG. 3. However, the present invention is not limited to such an embodiment and other embodiments and other mesh network devices can be used to practice the invention.

In one embodiment, the wireless transceiver 104 connects to wireless mesh networks 3. In another embodiment, the wireless transceiver 104 includes a radio frequency (RF) transceiver, an IEEE 802.11a, 802.11b, 802.11g, 802.11n, 802.15.4 (ZigBee), 802.16a, 802.16g, "Wireless Fidelity" (Wi-Fi), "Worldwide Interoperability for Microwave Access" (WiMAX), ETSI High Performance Radio Metropolitan Area Network (HIPERMAN) "RF Home," Bluetooth, infrared, RFID or other type of wireless transceivers for connecting to non-mesh networks 19. However, the present invention is not limited to such an embodiment and other wireless transceivers can be used to practice the invention.

In one exemplary embodiment, the display component 106 includes a Thin Film Transistor (TFT) high-resolution display screen displaying a graphic interface (GUI) for displaying information. As is known in the art, a TFT is type of LCD flat panel display screen in which each pixel is controlled by one to four transistors. TFT displays are sometimes called active matrix Liquid Crystal Diodes (LCDs). In another embodiment, the display component 106 is an LCD display screen. As is known in the art, a liquid crystal display (LCD) is a thin, flat electronic visual display that uses the light modulating properties of liquid crystals (LCs) to display information. However, the present invention is not limited to such display screens and other display screens can be used in the device 102 to practice the invention.

In one exemplary embodiment, the plural remote control key buttons 108 include mechanical buttons. In another embodiment, the plural remote control key buttons 108 include graphical buttons. The plural remote control key buttons 108 include markings for controlling various network devices, such as televisions 78, set-top boxes, DVD players, computers 18, audio devices, video devices, still and video cameras 22, mobile phones 16, portable gaming devices (e.g., Nintendo DSI, Sony PSP, etc.) non-portable gaming devices (Sony Play Station, Nintendo Wii, Microsoft X-Box, etc.), environment control devices, Internet access points, wireless access points, smart phones (e.g., Apple, iPhone, Research In Motion (RIM) Blackberry, Samsung and Motorola Droid, etc.) and/or tablet computers (e.g., Apple iPad, etc.) However, the present invention is not limited to such an embodiment and other an be used in the device 102 to practice the invention.

In one exemplary embodiment, the power switch 110 turns the device 102 on and off. In one embodiment, the power switch 110 is a mechanical button. In another embodiment, the power switch 110 is a graphical button. However, the present invention is not limited to such and embodiment an other an be used in the device 102 to practice the invention In one exemplary embodiment, the finger touch scroll component 112 includes a touch-screen component. As is known in the art, a touch screen is an electronic visual display that can detect the presence and location of a selection input touch within the display area. The term generally refers to touching the display of the device with a finger or hand. Touch screens can also sense other passive objects, such as a stylus. The finger touch scroll component allows a user to scroll items displayed on the display screen 106 up and down. However, the present invention is not limited to such an embodiment and other an be used in the device 102 to practice the invention.

In one exemplary embodiment, the internal controlling components 114 include one or more processors 29, a universal serial bus (USB) interface 30, a flash memory 32, an erasable electronically programmable read only memory (EEPROM) 34, a first-in-first-out (FIFO) buffer 36, a data link component 38, a wireless transceiver 40, a wireless RF antenna 42, a clock 44, a security interface 46 and a power source 48 (e.g., battery, DC power source, AC power source, etc). The flash memory 32 and/or the EEPROM 34 includes one or more application programs 33 used to receive and transmit data and manage the device 102. However, the present invention is not limited to such an embodiment and more, fewer or other controlling components ca be used in the device 102 to practice the invention.

The internal controlling components 114 include an application executing on the one or more processors from the flash memory or the EEPROM for providing a graphical user interface (GUI) on the display component and networking functions on the mesh network 12, 20 and the non-mesh communications network 19.

In one embodiment, wireless transceiver 40 includes a (WiMAX) wireless ultra-wideband transceiver. In another embodiment, the wireless transceiver 40 includes a baseband wireless transceiver. However, the present invention is not limited to the wireless transceivers described and other wireless transceivers can also be used to practice the invention.

FIG. 10 is a flow diagram illustrating a Method 200 of transceiving information on a mesh network device. At Step 202, original electronic information is received on an application on mesh network remote control device from a network device with one or more processors on a non-mesh communications network. The original electronic information includes one or more commands to cause a desired mesh network device with one or more processors to execute an action. At Step 204, the application on the mesh network device stores the original electronic information in non-volatile storage. At Step 206, the original electronic information is transformed on the application on the mesh network remote control device into new display information. At Step 208, the application maps the new display information to an individual remote control key button on the mesh network remote control device. Step 210, the display format information is displayed on a display screen on the mesh network remote control device. At Step 212, a selection input is received from the individual remote control key button or the finger touch scroll component including the new display information. At Step 214, the display format information is mapped back to the original electronic information stored in non-volatile storage. At Step 216, a request is sent from the mesh network remote control device to the desired mesh network device on the mesh communications network, thereby causing the desired mesh network device to execute an action.

Method 200 is illustrated with one exemplary embodiment. However, the present invention is not limited to such an embodiment and other embodiments can also be used to practice the invention.

In such an exemplary embodiment at Step 202 original electronic information is received on the application 33 on the mesh network remote control device 102 from a network device 21, 23 with one or more processors on a non-mesh communications network 19. The original electronic information includes one or more commands to cause a desired mesh network device (e.g., 78, etc.) with one or more processors to execute an action.

For example, the original electronic information may include one or more commands including a URL 116 (FIG. 9) (e.g., "www.abc.com/news," etc.) or other network address and/or network command from an Internet ready television 78 or computer 18, a camera 22, etc. or other type of a mesh network device specific command (e.g., on/off, change channel, display, etc.).

In one embodiment, the one or more commands include one or more commands include one or more commands to display Internet television and/or Internet Protocol (IP) television and/or Web-TV services and/or CATV and/or satellite TV and/or CATV video on demand services, digital movie services (e.g., NETFLIX, BLOCKBUSTER, REDBOX, etc.) and/or broadcast television services and/or Internet services.

In one embodiment, the one or more commands include operational commands (e.g., change channel, turn volume up/down, stop/start audio/video, download/upload files, display web-site, create new window, etc.).

In one embodiment, the one or more commands include audio commands, such as voice commands and/or RFID 17 audio commands. The RFID audio commands are received from RFID tags, RFID sensors and/or RFID portals.

However, the present invention is not limited to such exemplary commands and more, fewer and/or other command can be used to practice the invention.

At Step 204, the application 33 on the mesh network remote control device 102 stores the original electronic information in non-volatile storage. In one embodiment, the original electronic information is stored in flash memory 32. However, the present invention is not limited to such an embodiment and other embodiments may be used to practice the invention.

At Step 206, the original electronic information is transformed with the application 33 on the mesh network remote control device 102 into new display information. In one embodiment, the new display information is information that conveys its message but is easier to read on and/or display on the display component 106. For example, a specific command to select a news television station on a television 78 connected to a mesh network 12, 20 (e.g., "www.abcnews.com", etc.) and this command may be transformed into a new display information "1. ABC News." This allows original electronic information in virtually any format and any length to be transformed, displayed and easily used by a user of the device 102.

At Step 208, the application 33 maps the new display information to an individual remote control key button 108' on the mesh network remote control device 102. This allows a command for the desired mesh network device 78 to be executed more quickly and easily. If the buttons 108 are graphical buttons, the individual remote control key button 108' includes a graphical label (e.g., ABC, etc.). If the buttons are mechanical buttons, the application 33 maps the new display information to an individual remote control key button 108' at a pre-determined location (e.g., left-to-right in the first row until all buttons are mapped, left-to-right in a second row until all buttons are mapped, etc.) for each piece of display information mapped to a button. However, the present invention is not limited to such embodiments and other embodiments, other ordering and other locations may also be used to practice the invention.

At Step 210, the new display format information is displayed 118 (FIG. 9) on a display component 106 on the mesh network remote control device 102 via the application 33.

At Step 212, a selection input is received from the individual remote control key button 108' or the finger touch scroll component) 12 including the new display information.

At Step 214, the new format information 118 is mapped back to the original electronic information 116 stored in non-volatile storage. For example, the display format information "1. ABC News" for ABC news is mapped back to the URL "www.abc.com/news."

At Step 216, a request is sent from the mesh network remote control device 102 to the desired mesh network device 78 on the mesh communications network 12, 20, thereby causing the desired mesh network device 78 to execute a desired action on the desired mesh network device 78 (e.g., display ABC News content on the TV 78, etc.).

FIG. 11 is a flow diagram illustrating a Method 218 of transceiving information on a mesh network device. At Step 220, location information is periodically received on a mesh network remote control device from a plural other mesh network devices with one or more processors via the home mesh network or a non-mesh communications network. At Step 222, the application stores the location information in non-volatile storage on the mesh network remote control device. At Step 224, electronic information is received on the application mesh network remote control device from the mesh network or the non-mesh communications network. The electronic information includes one or more commands to cause a desired mesh network device with one or more processors to execute a desired action. At Step 226, a current location of the desired mesh network device is determined with the application on the mesh network or the non-mesh communications network using the received location information. At Step 228, the received electronic information is securely sent from the application to the desired mesh network device via the mesh network or the non-communications mesh network, thereby causing the desired mesh network device to execute a desired action.

Method 218 is illustrated with one exemplary embodiment. However, the present invention is not limited to such an embodiment and other embodiments can also be used to practice the invention.

In such an exemplary embodiment, at Step 220, location information is periodically received on the application 33 on the mesh network remote control device 102 from plural other mesh network devices 14, 16, 17, 18, 22, 78 on a home mesh network 12, 20 with one or more processors via the home mesh network 12, 20 or a non-mesh communications network 19. The mesh network remote control device 102 is connected to both the home mesh network 12, 20 and the non-mesh communications 19.

The plural other mesh network devices 14, 16, 17, 18, 22, 78 may be any combination of non-mobile (e.g., TV 78, etc.) and mobile network devices (e.g., 14, 16, 18, 22, etc.) that are connected to the home mesh network 12, 20 at the desired location or have physically moved to a new physical location away from the desired location and away from the home mesh network 12, 20. However, the present invention is not limited to this embodiment and other embodiments can also be used to practice the invention.

At Step 222, the application 33 on the mesh network remote control device 102 stores the location information in non-volatile storage (e.g., flash 32, etc.) on the mesh network remote control device 102.

At Step 224, electronic information is received on the application 33 from the home mesh network 12, 20 or the non-mesh communications network 19. The electronic information includes one or more commands to cause a desired mesh network device (e.g., 78, etc.) with one or more processors to execute a desired action (e.g., start displaying television services, turn device on/off, etc.)

At Step 226, a current location of the desired mesh network device 78 is determined with the application 33 on the mesh network 12, 20 or the non-mesh communications network 19 using the received location information.

In one embodiment, the current location a current physical location in Two dimensional 2D(X,Y) space and/or 3D(X,Y,Z) space and/or Global Positioning System (GPS) space.

In one embodiment, the current physical location information includes GPS information, street address information, 2D (X,Y) (e.g., building, floor), 3D(X, Y, Z) (e.g., building, floor, floor location (e.g., room, office, desk, etc.)) or other physical location information (e.g., longitude, latitude, street address, etc.). However, the present invention is not limited to such current physical location information and other current physical location information can also be used to practice the invention.

The Global Positioning System (GPS) is a space-based global navigation satellite system (GNSS) that provides reliable location and time information in all weather and at all times and anywhere on or near the Earth. A GPS receiver calculates its position by precisely timing signals sent by GPS. A GPS receiver uses the messages it receives to determine a transit time of each message and computes a distance to each GPS satellite. These distances along with the satellites' locations are used with the possible aid of triangulation, depending on which algorithm is used, to compute a current physical position of the GPS receiver. This position is then displayed, perhaps with a moving map display (e.g., at a street level, etc. and/or latitude and longitude and/or elevation information may also be included. Many GPS units also show derived information such as travel direction and speed, calculated from position changes. The GPS coordinates include standard GPS, GPS map, Digital GPS (DGPS) and/or other types of GPS information.

In another embodiment, the current location includes a network location (i.e., a mesh network 12, 20 address, a non-mesh communications network 19 address, etc. (e.g., IP address, MAC address, other network address, etc.)).

In one embodiment, the home mesh network 12, 20, includes mesh network devices (e.g., HDTV 78, etc.) that are not removed from a desired physical location (e.g., a living room in a house, etc.) In another embodiment, the mesh network 12, 20 includes only non-mobile mesh network devices (e.g., HDTV 78, etc.) that are not removed from the desired physical location and mesh network devices (e.g., mobile phone 16, camera 22, etc.) that are mobile and are periodically removed from the desired physical location (e.g., mobile phone 16, camera 22, etc.).

At Step 228, the received electronic information is securely sent from the application 33 to the desired mesh network device 78 via the mesh network 12, 20 or the non-mesh communications network 19, thereby causing the desired mesh network device 78 to execute a desired action.

In one embodiment, Method 216 allows the mesh network remote control device 102 to initiate actions on local mesh network devices connected to the home mesh network 12, 20 and remote mesh network devices that are no longer connected to the home mesh network 12, 20, but are still connected to the non-mesh communications network 19 that have move away from the desired physical location and are too far out of range to communicate with the home mesh network 12, 20.

In one embodiment, the mesh network remote control device 102 is also a mobile mesh network device that can be removed from the desired physical location and still locate other mesh network devices via the home mesh 12, 20 (if it is still in range, etc.) and/or a remote mesh network 12, 20, and/or the non-mesh communications network 19.

In another embodiment, the mesh network remote control device 102 cannot be removed from the desired physical location, but is mobile within the desired location and is still in communications with other mesh network devices 14, 16, 17, 18, 22, 78, the desired home mesh network 12, 20 and/or the non-mesh communications network 19.

FIG. 12 is a flow diagram illustrating a Method 230 of transceiving information on the mesh network device. At Step 232, a request message is sent from the application on mesh network remote control device to the non-mesh communications network. The message includes a request for multimedia content, television services, a search engine query and/or login request. At Step 234, a response message is received on the application from the non-mesh communications network. At Step 236, the application determines a current location of the desired mesh network device on the home mesh network or the non-mesh communications network using stored location information. At Step 238, the application securely sends the response message to a desired mesh network device via a home mesh network or the non-communications mesh network, thereby causing the desired mesh network device to execute a desired action on the desired mesh network device.

Method 230 is illustrated with one exemplary embodiment. However, the present invention is not limited to such an embodiment and other embodiments can also be used to practice the invention.

In such an exemplary embodiment at Step 232 a request message is sent from the application 33 on mesh network remote control device 102 to the non-mesh communications network 12. The message includes a request for multi-media content (e.g., web-site content, video on demand, etc.), television services (e.g., Internet, CATV, satellite, etc.), a search engine query and/or a login request (e.g., e-mail account, social networking account, etc.).

The social networking accounts include, but are not limited to social networking web-sites, dating web-sites, blogs, RSS feeds, and other types of information web-sites in which messages can be left or posted for a variety of activities (e.g., FACEBOOK, U-TUBE, TWITTER, MY-SPACE, MATCH.COM, E-HARMONY, etc.).

At Step 234, a response message is received on the application 33 from the non-mesh communications network 19. The response message includes a URL, other network identifier, one or more commands or other information to get the desired mesh network device to execute an action (e.g., display, etc.).

At Step 236, the application determines a current location of the desired mesh network device on the home mesh network or the non-mesh communications network using stored location information (e.g., that stored at Step 222, or newly determined, etc.).

At Step 238, the application 33 securely sends the response message to a desired mesh network device 78 via the home mesh network 12, 20 or the non-communications mesh network 19, thereby causing the desired mesh network device 78 to execute a desired action on the desired mesh network device 78 (e.g., display multi-media content, initiate television services, display search engine query results, etc.)

The methods and system described herein can also be practiced with a smart application on a smart phone, such as the iPhone by Apple, Inc., the Droid by Samsung, Inc., the Blackberry by Research In Motion, etc. and/or on a table computer such as the iPad, by Apple, Inc., etc. In such an embodiment, the functionality of the methods are included in the smart application and hardware of the smart phone and/or table computer is used to provide hardware for the mesh network devices described herein. In another embodiment, network devices 26, 58 are plugged into, and manufactured as an integral component of a smart phone and/or a table computer. In such embodiments, the smart phone and/or tablet computer is placed somewhere inside the vehicle 158 and/or carried by an operator of the vehicle 158.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method of transceiving information on a mesh network device, comprising:

receiving original electronic information on an application on a mesh network remote control device from a network device with one or more processors on a non-mesh communications network, wherein the original electronic information includes one or more commands to cause a desired mesh network device with one or more processors to execute an action, wherein the mesh network remote control device comprises: a wireless transceiver for communicating with a mesh network and a non-mesh communications network and for communicating with a plurality of other network devices connected to the mesh network or the non-mesh communications network, a display component for displaying electronic information on the mesh network remote control device, a plurality of remote control key buttons for controlling other network devices on the mesh network or the non-mesh communications network, a power switch for turning power to the mesh network remote control device on and off, a finger touch scroll component for providing an display area that can detect a presence and location of a selection input touch within the display area, an audio decoder for accepting audio commands, a plurality of internal electrical controlling components with one or more processors including: a universal serial bus (USB) interface, a flash memory, an erasable electronically programmable read only memory (EEPROM), a first-in-first-out (FIFO) buffer, a wireless RF antenna, a clock, one or more processors, a security interface and a power source, the application executing on the one or more processors from the flash memory or the EEPROM for providing a graphical user interface (GUI) on the display component and networking functions on the mesh network and the non-mesh communications network;

storing with the application the original electronic information in non-volatile storage on the mesh network remote control device;

transforming on the application the original electronic information into new display information;

mapping the new display information to an individual remote control key button;

displaying with the application the new display information on the display component on the mesh network remote control device;

receiving a selection input from the individual remote control key button or the finger touch scroll component including the new display information;

mapping the new display information back to the original electronic information stored in non-volatile storage; and sending a secure request including the original electronic information from the mesh network remote control device to the desired mesh network device on the mesh network, thereby causing the desired mesh network device to execute a desired action.

2. The method of claim 1 wherein the one or more commands include one or more commands to display Internet television, Internet Protocol (IP) television, Web-TV, digital movie services, cable television services, satellite television services, video on demand services or Internet services.

3. The method of claim 1 wherein the one or more commands include one or more commands include audio commands including voice commands or Remote Frequency Identification (RFID) audio commands.

4. The method claim 1 wherein the wireless transceiver includes an ultra wideband Worldwide Interoperability for Microwave Access (WiMAX) wireless transceiver or a baseband wireless transceiver.

5. The method of claim 1 wherein the non-mesh communications network includes a Public Switch Telephone Network (PSTN), Internet cable television or satellite non-mesh communications network.

6. A method of transceiving information on a mesh network device, comprising:

receiving periodically location information on a mesh network remote control device from a plurality of other mesh network devices on a home mesh network with one or more processors via the home mesh network or a non-mesh communications network, wherein the mesh network remote control device comprises: a wireless transceiver for communicating with the home mesh network and a non-mesh communications network and for communicating with a plurality of other network devices connected to the home mesh network or the non-mesh communications network, a display component for displaying electronic information on the home mesh network remote control device, a plurality of remote control key buttons for controlling other network devices on the home mesh network or the non-mesh communications network, a power switch for turning power to the mesh network remote control device on and off, a finger touch scroll component for providing an display area that can detect a presence and location of a selection input touch within the display area, an audio decoder for accepting audio commands, a plurality of internal electrical controlling components with one or more processors including: a universal serial bus (USB) interface, a flash memory, an erasable electronically programmable read only memory (EEPROM), a first-in-first-out (FIFO) buffer, a wireless RF antenna, a clock, one or more processors, a security interface and a power source, an application executing on the one or more processors from the flash memory or the EEPROM for providing a graphical user interface (GUI) on the display component and networking functions on the home mesh network and the non-mesh communications network;

storing with the application the location information in non-volatile storage on the mesh network remote control device;

receiving with the application electronic information from the home mesh network or the non-mesh communications network, wherein the electronic information includes one or more commands to cause a desired mesh network device with one or more processors to execute a desired action;

determining with the application a location of the desired mesh network device on the home mesh network or the non-mesh communications network using the received location information; and sending securely with the application the received electronic information to the desired mesh network device via the home mesh network or the non-communications mesh network, thereby causing the desired mesh network device to execute a desired action.

7. The method of claim 6 wherein the one or more commands include one or more commands to display Internet television, Internet Protocol (IP) television, Web-TV, digital movie services, cable television or satellite television services or Internet services.

8. The method of claim 6 wherein the wireless transceiver includes an ultra wideband Worldwide Interoperability for Microwave Access (WiMAX) wireless transceiver or a baseband wireless transceiver.

9. The method of claim 6 further comprising:

sending a request message from the application mesh network remote control device to the non-mesh communications network, wherein the message includes a request for multi-media content, television services, account login request or a search engine query;

receiving a response message on the application from the non-mesh communications network;

determining with the application a current location of the desired mesh network device on the home mesh network or the non-mesh communications network using the stored location information; and sending securely with the application the response message to the desired mesh network device via the home mesh network or the non-communications mesh network, thereby causing the desired mesh network device to execute a desired action on the desired mesh network device.

* * * * *